United States Patent
Sakamoto et al.

(10) Patent No.: US 10,579,895 B2
(45) Date of Patent: Mar. 3, 2020

(54) INFORMATION PROCESSING APPARATUS, EXTRACTION METHOD, AND MEDIUM

(71) Applicant: CANON KABUSHIKI KAISHA, Tokyo (JP)

(72) Inventors: Ryo Sakamoto, Kyoto (JP); Masahiro Yakami, Kyoto (JP); Daisuke Furukawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 77 days.

(21) Appl. No.: 15/845,892

(22) Filed: Dec. 18, 2017

(65) Prior Publication Data

US 2018/0181828 A1  Jun. 28, 2018

(30) Foreign Application Priority Data

Dec. 28, 2016 (JP) .................................. 2016-256154

(51) Int. Cl.
*G06K 9/46* (2006.01)
*G06T 7/00* (2017.01)
*G06T 11/00* (2006.01)
*G06T 7/11* (2017.01)

(52) U.S. Cl.
CPC .......... *G06K 9/4604* (2013.01); *G06T 7/0012* (2013.01); *G06T 7/11* (2017.01); *G06T 11/003* (2013.01); *G06T 2207/10081* (2013.01); *G06T 2207/30061* (2013.01)

(58) Field of Classification Search
CPC ....... G06T 7/11; G06T 7/0012; G06T 11/003; G06T 2207/10081; G06T 2207/30061; G06K 9/4604
See application file for complete search history.

(56) References Cited

U.S. PATENT DOCUMENTS

2005/0286750 A1* 12/2005 Dehmeshki ............ G06K 9/342
382/131

FOREIGN PATENT DOCUMENTS

JP  2009-273644 A  11/2009

* cited by examiner

*Primary Examiner* — Leon Flores
(74) *Attorney, Agent, or Firm* — Canon U.S.A., Inc. IP Division

(57) ABSTRACT

An information processing apparatus includes an acquisition unit that acquires, in a medical image, a first region and a second region different from the first region, a limiting unit that limits extracting a third region, connecting the first region and the second region, within a range including an extraction direction determined based on the first region; and an extraction unit that extracts the third region within the range limited by the limiting unit.

25 Claims, 9 Drawing Sheets

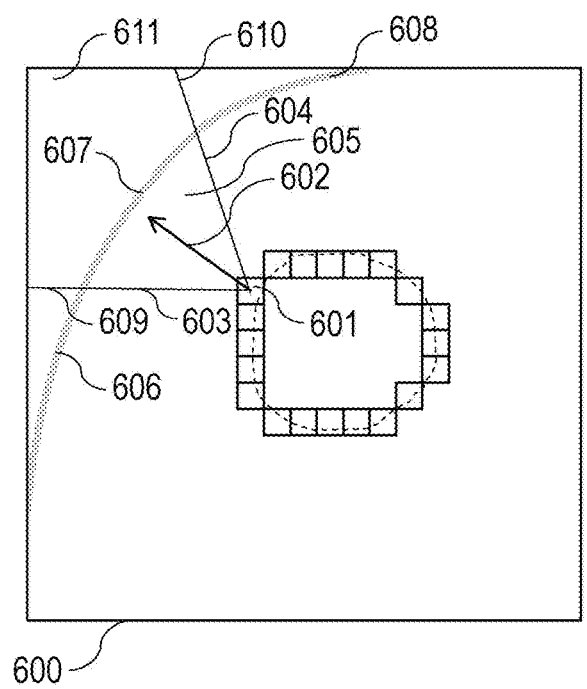 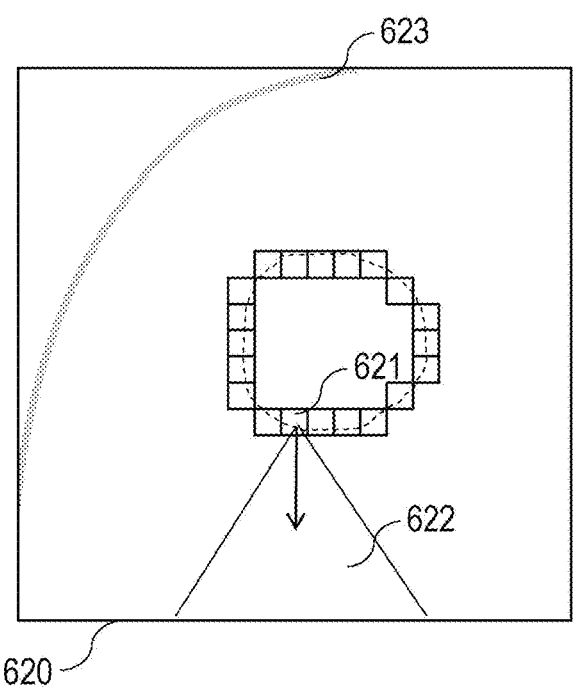

INFORMATION PROCESSING APPARATUS, EXTRACTION METHOD, AND MEDIUM

BACKGROUND

Field

The present disclosure relates to an information processing apparatus, an extraction method, and a program.

Description of the Related Art

Computer aided diagnosis (CAD) is known as a technique to analyze a medical image using a computer and provide information that helps a doctor in performing image interpretation.

A differential diagnosis of a pulmonary nodule is an example of an image interpretation job in which assist by CAD is useful. In the differential diagnosis of a pulmonary nodule, when a nodule exists in a lung field region in a chest X-ray CT image, a diagnosis is made as to whether the nodule is benign or malignant. In the diagnosis, one of criteria referred to by a doctor is whether there is a pleural indentation (a pleural invagination) or not. A pleural indentation occurs when a nodule indents a nearby part of a normal pleura into the inside of the nodule, and existence of a pleural indentation suggests that the nodule is malignant. Thus, a doctor observes a part surrounding the nodule to check whether there is a pleural indentation or not.

To use a computer to assist a visual diagnosis made by a doctor as to whether there is a pleural indentation or not, a CAD system needs to extract a pleural indentation region when a pleural indentation exists in a medical image. Japanese Patent Laid-Open No. 2009-273644 discloses a technique to extract a region of a pleural indentation existing in a medical image. In the technique disclosed in Japanese Patent Laid-Open No. 2009-273644, a nodule is first extracted from a medical image and then a stick-like anatomical structure extending from a nodule surface is extracted. In a case where the extracted anatomical structure reaches a pleura, that is, in a case where the extracted anatomical structure is in contact with both the nodule and the pleura, this anatomical structure is extracted as a pleural indentation.

There are anatomical structures, other than pleural indentations, which are in contact with both a nodule and a pleura. Therefore, a stick-like anatomical structure extending from a nodule surface is not necessarily an anatomical structure of a type of interest (such as a pleural indentation). That is, the technique disclosed in Japanese Patent Laid-Open No. 2009-273644 has a problem that it is difficult to extract an anatomical structure of a type of interest with high accuracy.

SUMMARY

The present disclosure provides a technique of extracting an anatomical structure with high accuracy.

According to an aspect of the present disclosure, an information processing apparatus includes an acquisition unit configured to acquire, in a medical image, a first region and a second region different from the first region, a limiting unit configured to limit extracting a third region, connecting the first region and the second region, within a range including an extraction direction determined based on the first region, and an extraction unit configured to extract the third region within the range limited by the limiting unit.

Further features will become apparent from the following description of exemplary embodiments with reference to the attached drawings.

BRIEF DESCRIPTION OF THE DRAWINGS

FIGS. 6A and 6B are schematic diagrams illustrating an example of a process of determining whether there is a pleura.

DESCRIPTION OF THE EMBODIMENTS

Figure 1:
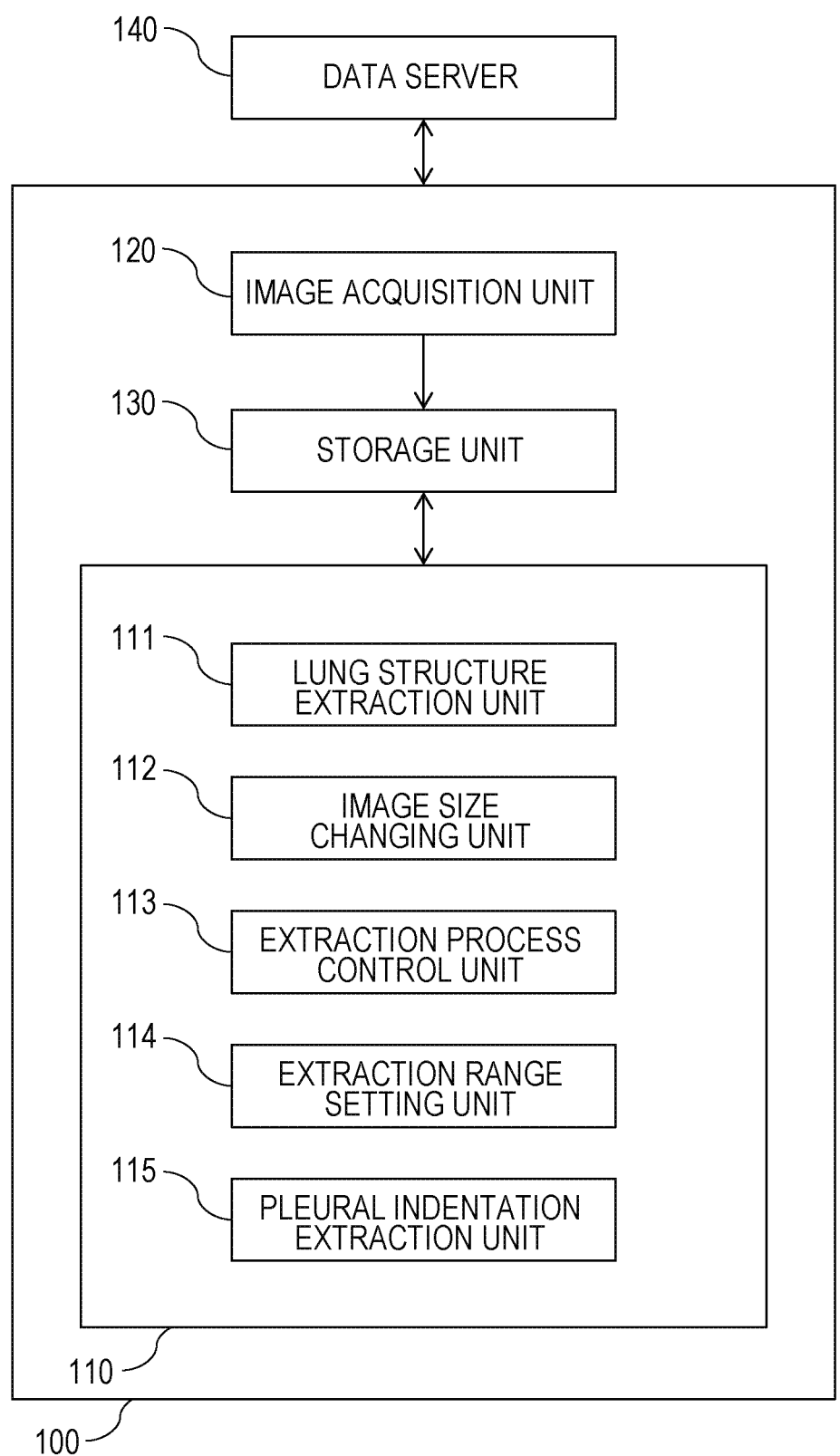
FIG. 1 is a diagram illustrating an example of a functional configuration of an image processing apparatus according to a first embodiment.

Embodiments are described below with reference to drawings. The same or similar constituent elements, parts, and processes are denoted by similar symbols or numerals throughout all figures, and duplicated descriptions thereof are omitted. Note that constituent elements, parts, and processes which are not important in illustration are not shown in some figures.

In embodiments disclosed below, a process of treating a three-dimensional chest CT image captured by an X-ray CT apparatus is described as an example. However, the present disclosure may be applied not only to three-dimensional chest CT images, but also to other types of images such as a CT image in which a whole trunk of a body is displayed. When an image including a nodule, a pleura, and a pleural indentation is captured by another type of image capturing apparatus, if the nodule, the pleura, and the pleural indentation represented in the image are visible with eyes, the present disclosure is applicable to the image. Furthermore, the present disclosure may be applied to an image regardless of whether the image is two-dimensional or three-dimensional. Note that the embodiments described below are merely examples, and the present disclosure may be implemented in other ways.

First Embodiment

An image processing apparatus according to a first embodiment is configured to read out a medical image (an original image) specified by an operator, and extract a pleura existing in the image. In a case where a pulmonary nodule (a nodule) exists, the image processing apparatus also extracts the nodule. The image processing apparatus then extracts a part of the pleura (a pleural indentation) indented by the nodule. More specifically, the image processing apparatus performs a region growth process for each pixel on a nodule surface employing the pixel as a starting point by using a method described below thereby extracting a region connected to the pixel. If the extracted region is in contact with the pleura, the image processing apparatus acquires this region as a pleural indentation.

The image processing apparatus according to the present embodiment is characterized in that a particular range (an extraction range) is set for each pixel on the nodule surface, and the pleura indentation extraction process is executed within each extraction range. The extraction range is determined based on an anatomical feature of the pleural indentation. More specifically, the extraction range is set based on following two points: (1) when a nodule indents a pleura, the nodule indents a nearby part of the pleura; (2) the pleural indentation occurs such that a pleura having a two-dimensional membrane structure is indented by a relatively small nodule (compared with the size of the pleura), and thus when the pleural indentation is seen from the side of the nodule, the pleural indentation exists within a region with the shape of a circular cone whose apex is located on the nodule.

In the image processing apparatus according to the present embodiment, based on the above-described anatomical feature (the medical feature) of the pleural indentation, the extraction range is defined, for example, by a range which starts from a pixel on the nodule surface and extends in a direction (an extraction direction) determined by a predetermined method.

In the image processing apparatus according to the first embodiment, the extraction direction is set based on the normal to the nodule surface at each pixel location on the nodule surface. This is because the nodule has a spherical or oval shape, and thus it is predicted that a nearby part of the pleura exists at a location pointed to by the normal to the nodule surface on each point on nodule surface.

Referring to FIG. 1, a functional configuration of the image processing apparatus according to the present embodiment is described below. An image processing apparatus 100 extracts a pleural indentation region from an image in the above-described manner. Note that the image processing apparatus is an example of an information processing apparatus. The image processing apparatus 100 includes an image processing unit 110, an image acquisition unit 120, and a storage unit 130.

Note that image processing apparatus 100 also includes a CPU and a ROM (not shown). The CPU executes a program stored in the ROM thereby achieving functions of the image processing unit 110 and the image acquisition unit 120.

Note that the image processing apparatus 100 may include only one CPU and one ROM or may include a plurality of CPUs and a plurality of ROMs. That is, at least one processor is connected to at least one memory, and when at least one processor executes a program stored in at least one memory, the image processing apparatus 100 provides functions of the image processing unit 110 and the image acquisition unit 120. Note that the processing apparatus is not limited to the CPU, but the processing apparatus may be a GPU or the like.

The image processing unit 110 extracts a pleural indentation region from an image. The image processing unit 110 includes a lung structure extraction unit 111, an image size changing unit 112, an extraction process control unit 113, an extraction range setting unit 114, and a pleura indentation extraction unit 115. The image processing apparatus 100 is connected to a data server 140 that provides input data to the image processing apparatus 100 and that stores data output from the image processing apparatus 100 such that the image processing apparatus 100 and the data server 140 are capable of communicating with each other.

The image acquisition unit 120 acquires an original image (for example, a three-dimensional chest CT image) from the data server 140. The acquired original image is stored in the storage unit 130.

The storage unit 130 is a memory that stores an image. Note that there is no particular restriction on the type of a medium forming the storage unit 130 as long as the storage unit 130 is capable of storing data.

The lung structure extraction unit 111 acquires the original image from the storage unit 130. The lung structure extraction unit 111 then acquires respective regions of the lung field, the nodule, and the pleura existing in the original image by applying an image segmentation method (which is also called, an image dividing method, a region dividing method, or a region extraction method), which is one of image processing methods, to the original image. It is possible to realize the acquisition of the respective regions of the lung field, the nodule, and the pleura by using one of various known methods, and thus a further description thereof is omitted here. Note that the lung structure extraction unit 111 is an example of an acquisition unit configured to acquire, in a medical image, a first region and a second region different from the first region. The first region is a region indicating the nodule and the second region is a region indicating the pleura.

As a result of the process described above, the lung structure extraction unit 111 acquires a lung field mask image indicating the region of the lung field existing in the original image, a lung field mask image indicating the region of the nodule, and a pleura mask image indicating the region of the pleura. Note that the mask image refers to a binary image in which a pixel value of each pixel indicates whether or not the pixel belongs to a region of interest.

For example, in the lung field mask image, of all pixels included in the original image, pixels (lung field pixels) indicating the lung field each have a pixel value of 1, while the other pixels (pixels outside the lung field) each have a pixel value of 0. Similarly, in the nodule mask image, for example, pixels (nodule pixels) indicating the nodule each have a pixel value of 1, and the other pixels (pixels outside the nodule) each have a pixel value of 0. In the pleura mask image, for example, pixels (pleura pixels) indicating the pleura each have a pixel value of 1, and the other pixels (pixels outside the pleura) each have a pixel value of 0. Note that the image size of each of these mask images is the same as the image size of the original image. The acquired lung field mask image, the nodule mask image, and the pleura mask image are stored in the storage unit 130.

Note that in the mask images, each pixel value may be assigned any value as long as pixels indicating an object of interest (for example, the lung field in the lung field mask image) are discriminated from the other pixels. For example, the pixel values of the mask images may be assigned either 1 or 2. Alternatively, each pixel value of the mask images may be assigned one of three values. This may be applied to any mask image according to any embodiment.

The image size changing unit 112 performs two types of image size changing processes. A first image size changing process is to cut out an image. After the lung structure extraction unit 111 ends the process, the image size changing unit 112 acquires, from the storage unit 130, the original image, the lung field mask image, the nodule mask image, and the pleura mask image. The image size changing unit 112 then cuts out parts of these images and produces new images representing extracted parts. An image cut-out region is set, for example, such that the barycentric position of the nodule region in the nodule mask image is employed as the center of a rectangle with a size determined according to a particular method, and a region enclosed in this rectangle is employed as the image cut-out range. Via this cut-out process, a local image is produced from the original image. Similarly, a local lung field mask image, a local nodule mask image, a local pleura mask image are produced respectively from the lung field mask image, the nodule mask image, and the pleura mask image. The four images produced in the above-descried manner are stored in the storage unit 130.

In a second image size changing process, the image size of the mask image (the local pleural indentation mask image) produced by the pleura indentation extraction unit 115 is changed to be equal to the image size of the original image. As will be described in further detail below, the pleura indentation extraction unit 115 extracts a region of a pleural indentation existing in a local image. Because the local image is an image cut out from the original image, the size of the local pleural indentation mask image acquired by the pleura indentation extraction unit 115 is different from the size of the original image. Thus, the image size changing unit 112 changes the image size of the local pleural indentation mask image such that the local pleural indentation mask image has the same image size as that of the original image. Note that this process is inverse, in procedure, to the first image size changing process.

The extraction process control unit 113 acquires, from the storage unit 130, the local image, the local lung field mask image, the local nodule mask image, and the local pleura mask image. The extraction process control unit 113 then controls the extraction range setting unit 114 and the pleura indentation extraction unit 115 to execute the extraction process to execute the pleural indentation region existing in the local image.

The extraction range setting unit 114 sets, based on the medical feature of the pleural indentation, the region within which the pleural indentation region is to be extracted by the pleura indentation extraction unit 115. That is, the extraction range setting unit 114 is an example of a limiting unit configured to limit a pleural indentation region extracted from a medical image, based on a medical feature of a pleural indentation, within a part of a region between a nodule and a pleura included in the medical image. More specifically, the extraction range setting unit 114 acquires, from the storage unit 130, the local image, the local nodule mask image, the local pleura mask image, and a nodule surface coordinate list, and the extraction range setting unit 114 sets an image range (extraction range) to be applied, in the process of extracting the pleural indentation region, to pixels on the nodule surface stored in the nodule surface coordinate list. Details of the process of setting the extraction range will be described later together with a description of the process performed by the image processing apparatus 100 according to the present embodiment.

The pleura indentation extraction unit 115 acquires, from the storage unit 130, the local image, the local lung field mask image, the local nodule mask image, and the local pleura mask image, and the pleura indentation extraction unit 115 extracts a pleural indentation region in the extraction range set by the extraction range setting unit 114. As with the lung structure extraction unit 111, the pleura indentation extraction unit 115 stores the extracted pleural indentation region, as a mask image (a local pleural indentation mask image), in the storage unit 130.

Figure 3A:
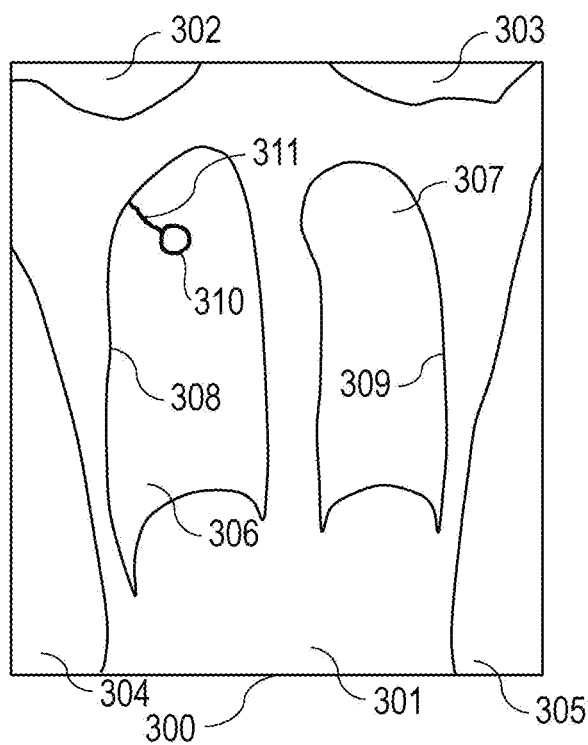
FIGS. 3A to 3D are schematic diagrams illustrating an example of a process of extracting a lung field structure.

Next, referring to FIGS. 3A to 3D, an example of an original image processed by the image processing apparatus 100 according to the present embodiment is described below. FIG. 3A illustrates an example of an original image. In FIG. 3A, an image 300 is one of cross-sectional images (coronal section images) included in a three-dimensional chest CT image (the original image). Although only representative one of cross-sectional images is illustrated because of a restriction of the drawing, the original image may include many cross-sectional images. Furthermore, for easier understanding, in the example shown in FIG. 3A, it is assumed that the original image is a collection of coronary section images. Note that the original image may be a collection of other types of cross-sectional images (for example, transverse section images or sagittal section images). Note that the original image is an example of an image representing at least a whole right or left lung field.

Objects represented in the original image 300 include a trunk 301 of a patient, and air regions 302, 303, 304, and 305 around the trunk. Furthermore, a right lung 306 and a left lung 307 exist inside the trunk 301. In a CT image, a right lung is located on a left-hand side of the image, while a left lung is located on a right-hand side of the image. In the image processing apparatus 100 according to the present embodiment, what is interested among anatomical structures existing in a human body is an anatomical structure related to the right lung 306 or the left lung 307, and it is not necessary to distinguish an anatomical structure existing outside both lungs. Therefore, as shown in FIG. 3A, the image of the human body is regarded as including following three regions: the right lung 306, the left lung 307, and the trunk 301 (the region, in the human body, outside both the right lung 306 and the left lung 307).

Pleurae are represented by a closed curve 308 that separates the right lung 306 and the trunk 301 and a closed curve 309 that separates the left lung 307 and the trunk 301. The pleurae are so thin that they are observed as line-shaped structures in the coronary section image. A massive structure existing in the right lung 302 of the patient is a nodule 310. A line-shaped structure 311 connected to both the nodule 310 and the pleura 308 is a pleural indentation region 311. In the present embodiment, the image processing apparatus 100 extracts this pleural indentation region 311.

Figure 2:
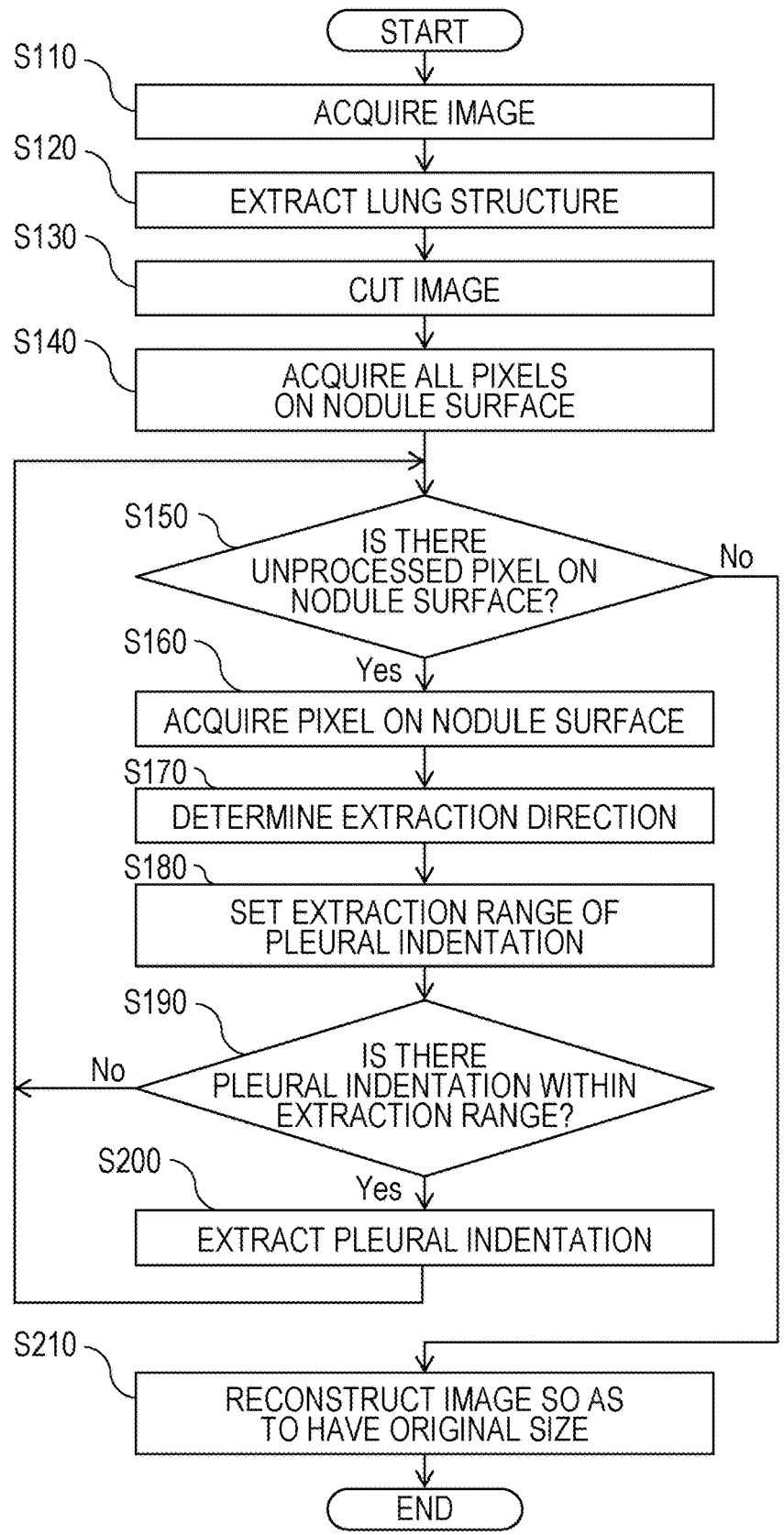
FIG. 2 is a flow chart illustrating an example of a procedure performed by the image processing apparatus according to the first embodiment.

Next, referring to FIG. 2, an example of a procedure performed by the image processing apparatus 100 according to the present embodiment is described below.

Step S110

In step S110, the image acquisition unit 120 acquires an original image from the data server 140 and stores the acquired original image in the storage unit 130.

Step S120

In step S120, the lung structure extraction unit 111 acquires the original image from the storage unit 130 and extracts respective regions of a lung field, a nodule, and pleura existing in the original image.

First, the lung structure extraction unit 111 extracts respective regions of the lung field and nodule existing in the original image. The regions of the lung field and the nodule each have a constant CT value within a CT image. Therefore, the lung structure extraction unit 111 is capable of extracting these regions by using a known image segmentation method (a thresholding process, a region growing method, a Level-set method, a Graph-cut method, etc.).

In extracting the lung field and the nodule, it may be allowed to use a pointing device such as a mouse or the like that the image processing apparatus 100 has. For example, an operator may specify, using the mouse, a location of the lung field or the nodule existing in the original image. When the operator specifies the location of the lung field or the nodule, the lung structure extraction unit 111 acquires position coordinates thereof. The lung structure extraction unit 111 uses the acquired position coordinate as information (for example, a grow starting point in the region growing method) in the image segmentation. By employing the method described above, the lung structure extraction unit 111 is capable of extracting the respective regions of the lung field and the nodule with high accuracy.

After extracting the respective regions of the lung field and the nodule, the lung structure extraction unit 111 extracts a pleura region. A pleura is a very thin membrane-shaped structure surrounding the lung field, and thus, in general, it is difficult to observe the pleura in the CT image. To handle the above situation, the lung structure extraction unit 111 extracts, from a region outside the lung field region, a closed-curve region with a fixed thickness on a peripheral edge (or a circumference) of the lung field region and regards the extracted closed-curve region as the pleura.

Finally, the lung structure extraction unit 111 stores the lung field region, the nodule region, and the pleura region acquired in the above-described manner as the lung field mask image, the nodule mask image, and the pleura mask image. The lung structure extraction unit 111 then stores theses mask images in the storage unit 130.

Figure 3B:
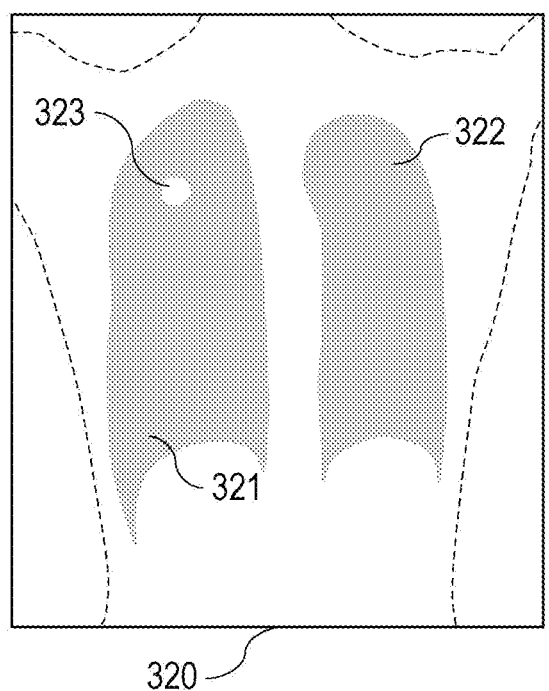

FIG. 3B illustrates an example of a lung field mask image acquired from the original image 300. In this example of the lung field mask image 320 shown in FIG. 3B, the right lung 306 in the original image 300 is extracted as a right lung field region 321. However, a region 323 corresponding to the nodule 310 existing in the right lung 306 is not included in the right lung field region 321. This is because there is a great difference in pixel value between the right lung field region 321 and the nodule region 323, and thus the nodule region 323 is not extracted in the lung field extraction process described above. The region of the left lung 307 is extracted as a left lung field region 322.

Figure 3C:
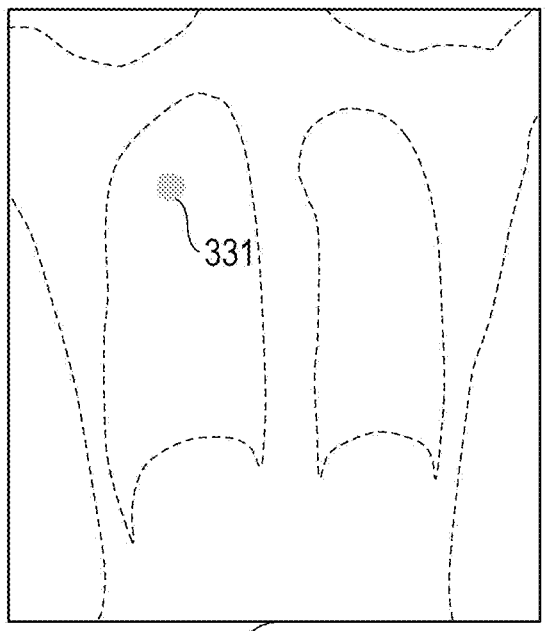

FIG. 3C illustrates an example of a nodule mask image acquired from the original image 300. In the example of the nodule mask image 330 shown in FIG. 3C, the nodule 310 existing in the right lung 306 in the original image 300 is extracted as a nodule region 331.

Figure 3D:
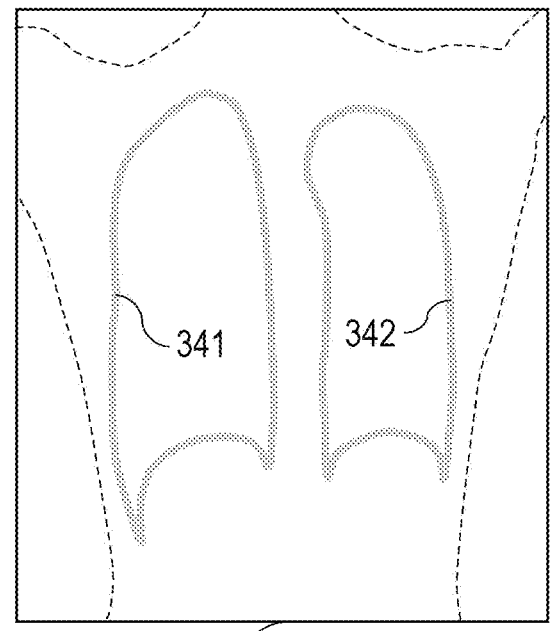

FIG. 3D illustrates an example of a pleura mask image acquired from the original image 300. In this example of the pleura mask image 340 shown in FIG. 3D, the pleura 308 of the right lung 306 in the original image 300 is extracted as a pleura region 341, and the pleura 309 of the left lung 307 is extracted as a pleura region 342.

Note that in FIGS. 3B, 3C, and 3D respectively illustrating the lung field mask image 320, the nodule mask image 330, and the pleura mask image 340, broken lines are drawn to indicate locations of the trunk 301, the pleura 308, and the pleura 309 in the original image. These broken lines are drawn to provide a better understanding, and these broken lines are not included in actual mask images.

Step S130

In step S130, the image size changing unit 112 acquires, from the storage unit 130, the original image, the lung field mask image, the nodule mask image, and the pleura mask image. The image size changing unit 112 then cuts out a specified region (a cut-out region) from each of the acquired images thereby producing a local image, a local lung field mask image, a local nodule mask image, and a local pleura mask image. Note that the original image is a three-dimensional image, and thus the cut-out region is defined by a rectangular parallelepiped region, and the images produced in the present step are three-dimensional images. In a case where the original image is a two-dimensional image, the cut-out region is a rectangular region, and the produced images are two-dimensional images. Note that the rectangular parallelepiped region may be a regular hexahedron region and the rectangular region may be a square region.

Figure 4A:
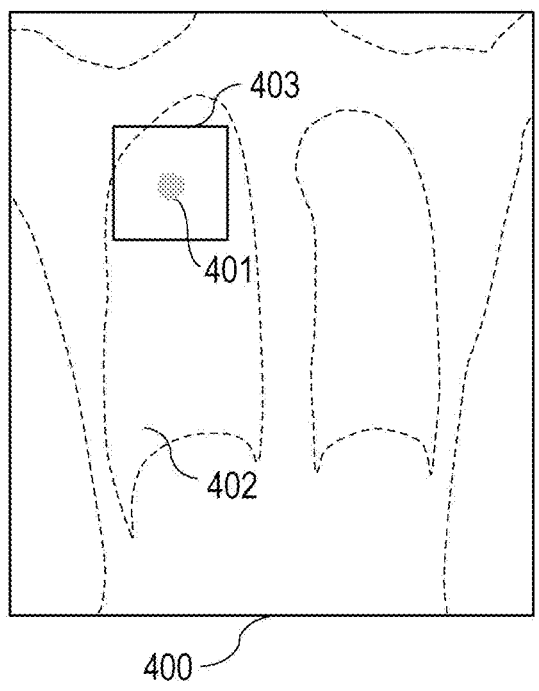
FIGS. 4A to 4D are schematic diagrams illustrating an example of a process of cutting out an image.

In the present embodiment, the image processing apparatus 100 sets the center position of the cut-out region at the barycentric position of the nodule region, and determines the size of the cut-out region based on the size of the nodule region. Referring to FIGS. 4A to 4D, the image cut-out process is described in further detail below. In FIG. 4A, an image 400 is a nodule mask image. This image 400 is the same as the nodule mask image 330 shown in FIG. 3A, and is shown here again as the nodule image 400.

First, the image size changing unit 112 determines the barycentric position of the nodule. Of the pixels of the nodule mask image, pixels belonging to the nodule region are referred to as nodule pixels, and pixels belonging to the other regions are referred to as pixels outside the nodule. In the image 400 shown in FIG. 4A, pixels belonging to a region 401 are nodule pixels, and pixels belonging to a region 402 in the image 400 other than the region 401 are images outside the nodule. Next, a set of nodule pixels is denoted by $S^{nodule}$, and coordinate values of respective nodule pixels are denoted by $P^{nodule}_{[i]} = (x^{nodule}_{[i]}, y^{nodule}_{[i]}, z^{nodule}_{[i]})$ where $i = 1, \ldots, \#(S^{nodule})$. Note that $\#(S^{nodule})$ is the number of combinations of coordinate values. Thus, the barycenter $G^{nodule} = (G^{nodule}_x, G^{nodule}_y, G^{nodule}_z)$ is given by formula (1) described below.

$$(G^{nodule}_x, G^{nodule}_y, G^{nodule}_z) = \frac{1}{\#(S^{nodule})} \sum_{i=1}^{\#(S^{nodule})} (x^{nodule}_{[i]}, y^{nodule}_{[i]}, z^{nodule}_{[i]}) \quad (1)$$

The image size changing unit 112 employs the calculated barycentric position of the nodule as the center position of the cut-out region to be applied to the original image, the lung field mask image, the nodule mask image, and the pleura mask image.

Next, the image size changing unit 112 determines the size of the cut-out region. Note that the size of the cut-out region is defined by the length of one side of the rectangular parallelepiped region. The length of one side of the rectangular parallelepiped region may be determined according to one of known methods. One of the simplest methods is to directly employ a value determined in advance according to a particular method. For example, when the image processing apparatus 100 is built, the image size changing unit 112 calculates the average distance between a nodule and a pleura from a plurality of chest CT images each including a nodule and a pleural indentation, and the image size changing unit 112 stores the calculated average distance in the data server 140. When the image size changing unit 112 determines the size of the cut-out region in step S130, the image size changing unit 112 acquires the average distance from the data server 140 and sets the length of one side of the rectangular parallelepiped region based on the acquired average distance. For example, in a case where the value of the average distance is $W_{voi}$, the image size changing unit 112 sets the lengths in respective directions along an X-axis, a Y-axis, and a Z-axis of the rectangular parallelepiped region to $2W_{voi}$. Taking into account a standard deviation $\sigma_{voi}$ of the distance between the nodule and the pleura, the lengths in the respective directions along the X-axis, the Y-axis, and the Z-axis of the rectangular parallelepiped region may be set to $2\ W_{voi}+2\sigma_{voi}$.

Another method of determining the size of the cut-out region is to determine the size based on a nodule diameter. More specifically, the image size changing unit 112 measures the nodule diameter from the nodule region in the nodule mask image. Here, let r denote the radius of the nodule. The image size changing unit 112 sets the size of the cut-out region to be equal to r times $2k_{voi}$ where $k_{voi}$ is a value determined from an average length of a pleural indentation indented by a nodule with a radius of r. More specifically, the value of $k_{voi}$ is determined such that the value of $k_{voi}$xr is larger than the average length of the pleural indentation of the nodule with the radius of r.

In the example of the image 400 illustrated in FIG. 4A, a cut-out region 403 for the nodule region 401 is set as shown in FIG. 4A. As may be seen from FIG. 4A, the center position of the cut-out region 403 is set at the barycentric position of the nodule region 401. The size of the cut-out region is set to be equal to 8 times the radius of the nodule.

After the center position $G^{nodule}$ and the size of the cut-out region are determined, the image size changing unit 112 cuts out an image in the cut-out region determined in the above-described manner from each of the original image, the lung field mask image, the nodule mask image, and the pleura mask image. The cut-out images are respectively employed as the local image, the local lung field mask image, the local nodule mask image, and the local pleura mask image. Each cut-out image is an example of an image representing a part of right or left lung field.

Finally, the image size changing unit 112 stores the produced local image, the local lung field mask image, the local nodule mask image, and the local pleura mask image in the storage unit 130.

Figure 4B:
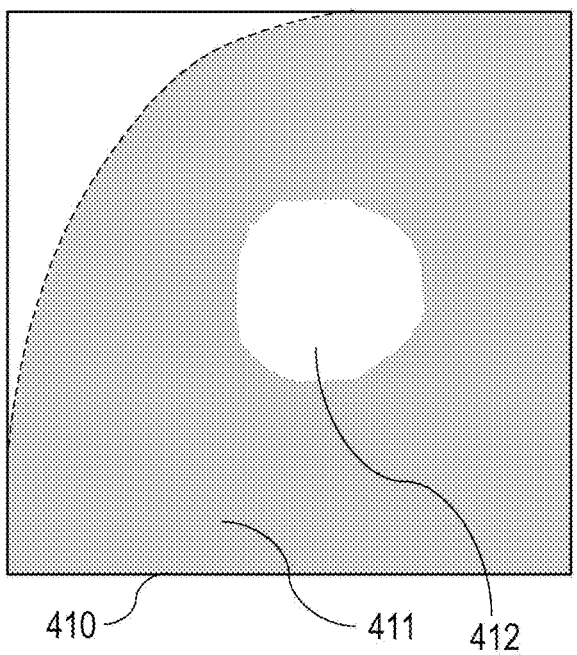

FIG. 4B illustrates an example of a local lung field mask image acquired from the lung field mask image. In FIG. 4B, a local lung field mask image 410 is an image obtained by cutting out the cut-out region set in the above-described manner in the present step from the lung field mask image 320 shown in FIG. 3B. A part of the lung field region 321 of the lung field mask image 320 is included as a lung field region 411 in the local lung field mask image 410. Note that a region corresponding to the region 323 regarded as an outside-nodule region in which the nodule exists actually is represented as an outside-nodule region 412 in the local lung field mask image 410.

Figure 4C:
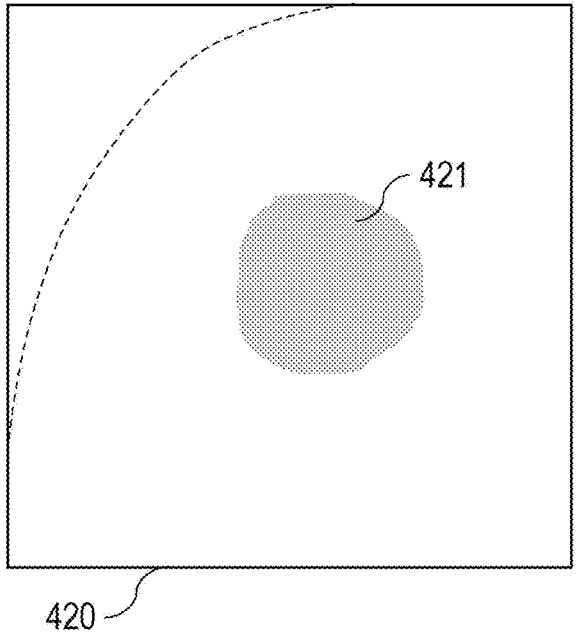

FIG. 4C illustrates an example of a local nodule mask image acquired from the nodule mask image. In FIG. 4C, a local nodule mask image 420 is an image obtained by cutting out the cut-out region set in the above-described manner in the present step from the nodule mask image 330 shown in FIG. 3C. A region corresponding to the nodule region 331 in the nodule mask image 330 is included as a nodule region 421 in the local nodule mask image 420. Note that in the local nodule mask image 420, a broken line is drawn at a location corresponding to the pleura 308 in the original image 300 shown in FIG. 3A. This broken line is drawn to provide an easier understanding, and the broken line is not included in the actual mask image.

Figure 4D:
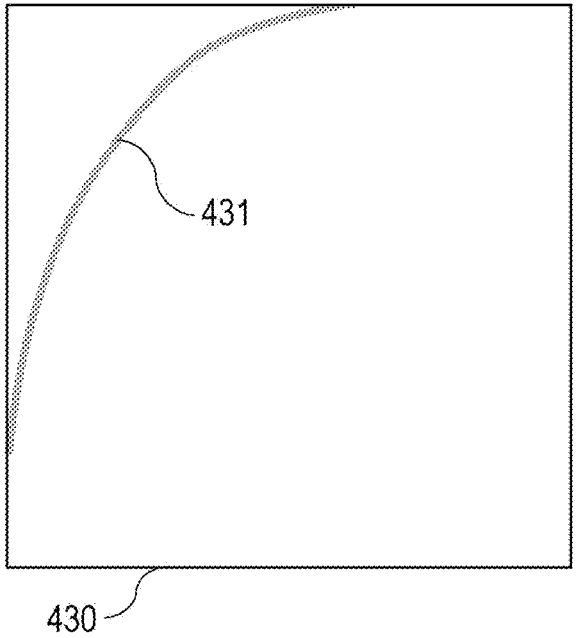

Finally, FIG. 4D illustrates an example of a local pleura mask image acquired from the pleura mask image. In FIG. 4D, a local pleura mask image 430 is an image obtained by cutting out the cut-out region set in the above-described manner in the present step from the pleura mask image 340 shown in FIG. 3D. The pleura region 341 of the right lung in the pleura mask image 340 is included as a pleura region 431 in the local nodule mask image 430 shown in FIG. 4D. The cut-out region set in the present step does not cover the left lung, and thus a pleura region corresponding to the pleura region 342 in the pleura mask image 340 is not included in the local nodule mask image 430.

Step S140

In step S140, the extraction process control unit 113 acquires pixels on the nodule surface in the nodule region existing in the local nodule mask image, and stores coordinate values of the acquired pixels in a one-dimensional list (a nodule surface coordinate list $L^{surface}$). This one-dimensional list may be stored in the storage unit 130 or in a memory (not shown) provided in the image processing apparatus 100. The process from step S150 to step S200 is performed repeatedly such that each pixel on the nodule surface is subjected to the process as described in further detail later. In the present step, to perform the process repeatedly in an efficient manner, the extraction process control unit 113 acquires pixels on the nodule surface in the nodule region existing in the mask image, and stores the coordinate values of the pixels in the nodule surface coordinate list $L^{surface}$.

The nodule surface coordinate list $L^{surface}$ is produced as follows. The extraction process control unit 113 scans the local nodule mask image (the image 420 in FIG. 4C) from one pixel to another starting with a pixel at a first location. When a nodule pixel (a pixel included in the region 421 in FIG. 4C) is found in the middle of the scanning, the extraction process control unit 113 check pixels located adjacent to this found nodule pixel. In a case where there is an outside-nodule pixel in the adjacent pixels, the extraction process control unit 113 determines that the nodule pixel found is a pixel on the nodule surface. Conversely, in a case where there is no outside-nodule pixel in the adjacent pixels, the extraction process control unit 113 ignores this nodule pixel and continues the scanning. The extraction process control unit 113 continues the process until a last pixel in the local nodule mask image is reached.

Figure 5A:
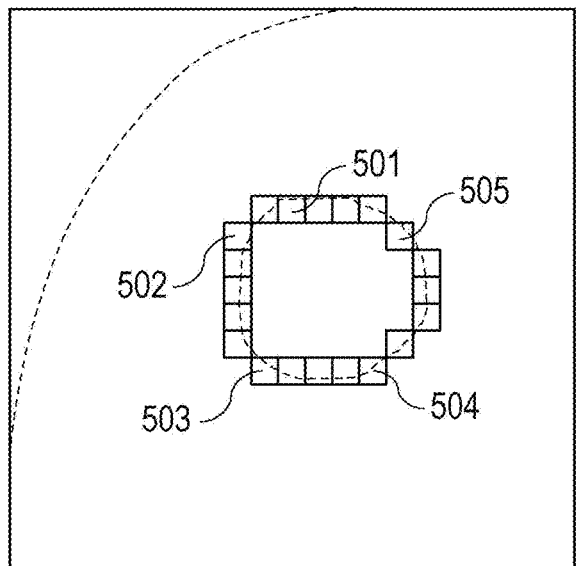
FIGS. 5A to 5C are schematic diagrams illustrating an example of a process of setting an extraction direction and an extraction range.
Figure 5B:
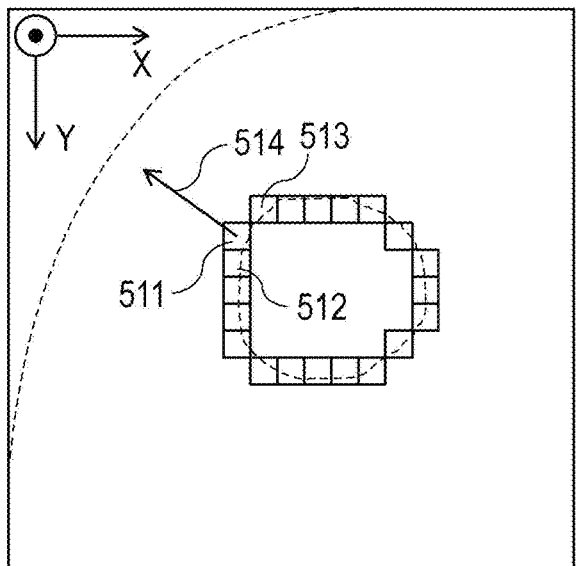
Figure 5C:
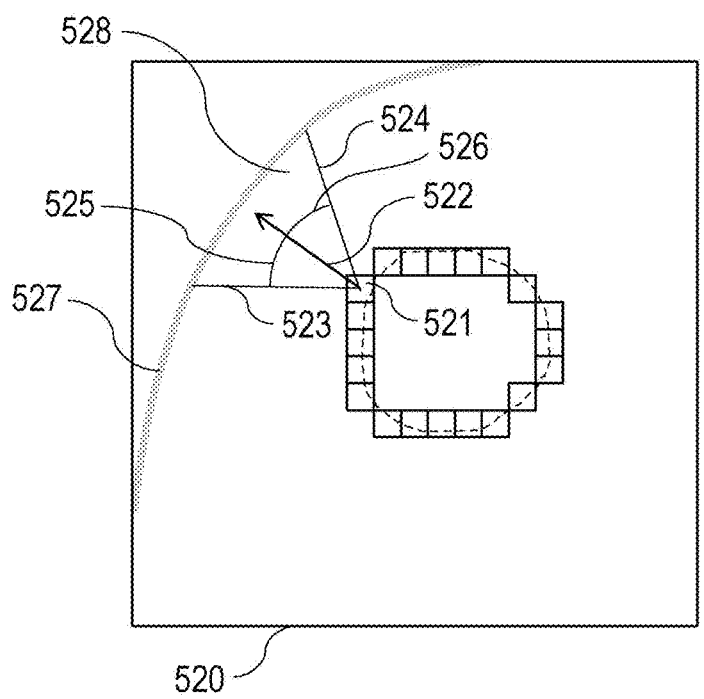

FIG. 5A illustrates an example of a set of pixels on the nodule surface acquired in the process described above. In FIG. 5A, an image 500 is an image obtained as a result of the process performed on the local nodule mask image 420 shown in FIG. 4C. In the image 500, rectangles shown on the nodule surface are pixels (a pixel 501, a pixel 502, a pixel 503, a pixel 504, a pixel 505, etc.) on the nodule surface. In FIGS. 5A to 5C, for easy illustration, all rectangles are not denoted by numerals, and only a total of 20 rectangles are extracted as pixels on the nodule surface.

Step S150

In step S150, the extraction process control unit 113 acquires the nodule surface coordinate list $L^{surface}$ stored in the storage unit 130. The extraction process control unit 113 then checks whether coordinate values of at least one or more nodule pixels are included in the nodule surface coordinate list $L^{surface}$. In a case where it is determined that coordinate values of at least one or more nodule pixels are included, a process in step S160 is performed. However, in a case where it is determined that the nodule surface coordinate list $L^{surface}$ does not include coordinate values of any nodule pixel, a process in step S210 is performed.

Step S160

In step S160, the extraction range setting unit 114 acquires the nodule surface coordinate list $L^{surface}$ stored in the storage unit 130. The extraction range setting unit 114 then acquires one set of coordinate values of one nodule pixel from the nodule surface coordinate list $L^{surface}$. The extraction range setting unit 114 stores the acquired coordinate values of the nodule pixel in the storage unit 130, and the extraction range setting unit 114 proceeds to step S170.

Hereinafter, the coordinate values of the nodule pixel acquired from the nodule surface coordinate list $L^{surface}$ are represented by $P^{surface}_{[i]}$ where i=1, . . . , #($L^{surface}$). Note that #($L^{surface}$) is the number of sets of coordinate values included in $L^{surface}$.

Step S170

In step S170, the extraction range setting unit 114 sets an extraction direction. First, the extraction range setting unit 114 acquires coordinate values $P^{surface}_{[i]}$ of nodule pixels stored in the storage unit 130.

Next, the extraction range setting unit 114 sets the extraction direction $D_{[i]}$. In the present embodiment, the image processing apparatus 100 sets the extraction direction $D_{[i]}$ in a direction along a normal to the nodule surface. Herein, the positive direction of the normal to the nodule surface is defined toward the outside from the inside of the nodule. The direction of the normal to the nodule surface may be calculated by one of many methods. One of the simplest methods is to make the calculation from pixels, on the nodule surface, adjacent to $P^{surface}_{[i]}$. More specifically, the extraction range setting unit 114 calculates the direction of a normal to a contour of a first region.

Figure 9A:
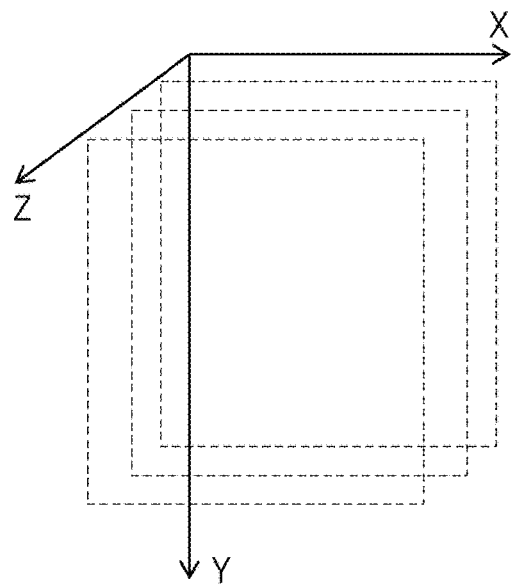
FIGS. 9A to 9C are schematic diagrams illustrating an example of a coordinate system of an image used in image processing performed by the image processing apparatus according to the first embodiment.
Figure 9B:
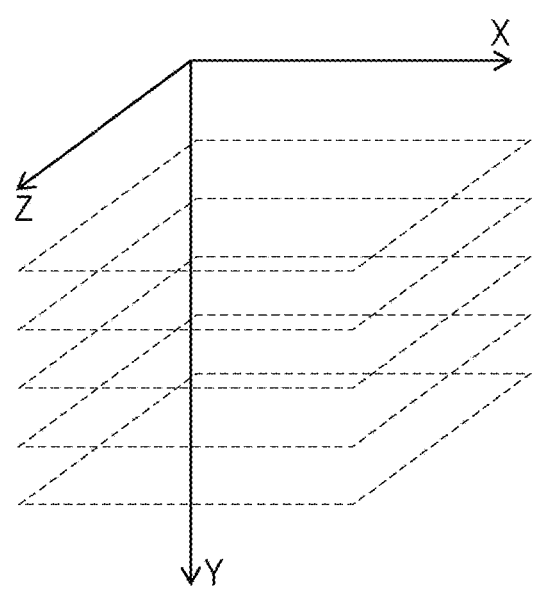
Figure 9C:
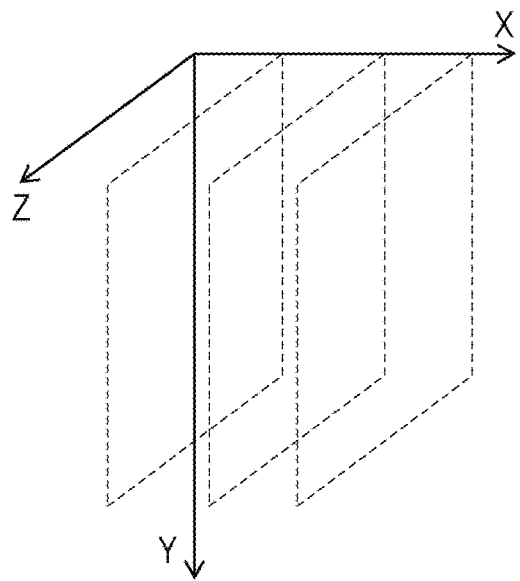

Before describing the method of calculating the normal direction in further detail, an example of coordinate system of the image processing apparatus 100 according to the present embodiment is described with reference to FIGS. 9A to 9C. In the image processing apparatus 100 according to the present embodiment, it is assumed by way of example that the original image includes a set of coronary section images. Hereinafter, in view of the above, as shown in FIG. 9A, an X-axis is defined from left to right in each coronary section image (a rectangle represented by a broken line in FIG. 9A), and a Y-axis is defined from up to down. Furthermore, a Z-axis is defined in a direction perpendicular to each coronary section image. When the coordinate system is set in the above-described manner, the original image may be reconstructed as a set of transverse sections in the coordinate system as shown in FIG. 9B. That is, the positive direction of the X-axis is from left to right in each transverse section image (a rectangle represented by a broken line in FIG. 9B), and the positive direction of the Z-axis is from up to down. The positive direction of the Y-axis extends through the respective transverse section images. In a case where the original image is reconstructed by a set of sagittal sections, the result represented in the coordinate system is as shown in FIG. 9C. That is, when each sagittal section image (each rectangle represented by a broken line in FIG. 9C) is seen from the side of the origin, the positive direction of the Z-axis is from left to right of the sagittal image, and the positive direction of the Y-axis is from up to down. The positive direction of the Z-axis extends through the respective sagittal sections.

A method of calculating the normal direction is described below with reference to FIG. 5B. FIG. 5B illustrates a manner of setting an extraction direction 514 with respect to a pixel 511 on the nodule surface. In FIG. 5B, the positive direction of the X-axis is defined from left to right in the image 510, and the positive direction of the Y-axis is defined from up to down.

Let a coronary section image passing through $P^{surface}_{[i]}$ be taken as an example in the following discussion. Of two pixels on the nodule surface adjacent to $P^{surface}_{[i]}$, a pixel located on a side in a counterclockwise direction is denoted by $P^{surface}_{[i][1]}=(x^{surface}_{[i][1]}, y^{surface}_{[i][1]})$. On the other hand, a pixel located on a side in a clockwise direction is denoted by $P^{surface}_{[i][2]}=(x^{surface}_{[i][2]}, y^{surface}_{[i][2]})$. In the image 510 shown in FIG. 5B, a pixel 512 is the pixel $P^{surface}_{[i][1]}$ whose location is shifted from a pixel 511 in the counterclockwise direction, and a pixel 513 is the pixel $P^{surface}_{[i][2]}$ whose location is shifted from the pixel 511 in the clockwise direction. Next, the extraction range setting unit 114 calculates the normal $n^{coronal}$ at $P^{surface}_{[i]}$ from the acquired two pixels on the nodule surface. More specifically, the normal $n^{coronal}$ is calculated according to formula (2) described below.

$$n^{coronal}=(n_x^{coronal}, n_y^{coronal})=(-y_{[i][1]}^{surface}+y_{[i][2]}^{surface}, x_{[i][1]}^{surface}-x_{[i][2]}^{surface}) \quad (2)$$

By performing a similar calculation, the extraction range setting unit 114 calculates a normal $n^{axial}=(n^{axial}_x, n^{axial}_z)$ passing through $P^{surface}_{[i]}$ in a transverse section image, and calculates a normal $n^{sagittal}=(n^{sagittal}_y, n^{sagittal}_z)$ in a sagittal section. In a case where the direction of $n^{axial}$ or $n^{sagittal}$ is toward the inside of the nodule, the extraction range setting unit 114 inverts the direction of the normal by inverting signs of components of the normal.

After the normal is calculated for each of all cross sections, the extraction range setting unit 114 calculates the extraction direction $D_{[i]}$. More specifically, the extraction direction $D_{[i]}=(D_x, D_y, D_z)$ is given by formula (3) described below.

$$(D_x, D_y, D_z) = \left( \frac{n_x^{axial}+n_x^{coronal}}{2}, \frac{n_y^{coronal}+n_y^{sagittal}}{2}, \frac{n_z^{axial}+n_z^{sagittal}}{2} \right) \quad (3)$$

One method of setting the extraction direction $D_{[i]}$ based on the normals at pixels on the nodule surface has been described above. However, the method of setting the extraction direction $D_{[i]}$ is not limited to that described above. For example, the extraction direction $D_{[i]}$ may be calculated using a Marching-cubes method. In this case, for example, first, the extraction range setting unit 114 determine a surface of the nodule region approximated by a set of triangular patches using the Marching-cubes method. Next, the extraction range setting unit 114 acquires a triangular patch covering $P^{surface}_{[i]}$ from the produced set of triangular patches, and calculates a direction perpendicular to this triangular patch. The resultant direction obtained in the above-described manner is employed as the extraction direction $D_{[i]}$ at $P^{surface}_{[i]}$.

Another method of setting the extraction direction $D_{[i]}$ is a method using an intensity gradient of a local image. Here, let $I_{voi}$ denote a local image, then the extraction direction $D_{[i]}$ is obtained by calculating a partial derivative of $I_{voi}$ at $P^{surface}_{[i]}$ with respect to x, y, and z according to formula (4) shown below.

$$(D_x, D_y, D_z) = \left( \frac{\partial I_{voi}}{\partial x}, \frac{\partial I_{voi}}{\partial y}, \frac{\partial I_{voi}}{\partial z} \right)_{P^{surface}_{[i]}} \quad (4)$$

A still another method of setting the extraction direction $D_{[i]}$ is a method using the barycenter of the nodule region (the barycenter of a first region) in the local nodule mask image. Here let $G^{nodule}=(G^{nodule}_x, G^{nodule}_y, G^{nodule}_z)$ denote the barycentric position of the nodule region in the local nodule mask image, then $D_{[i]}$ is calculated according to formula (5) shown below.

$$(D_x, D_y, D_z) = (x_{[i]}^{surface} - G_x^{nodule_1}, y_{[i]}^{surface} - G_y^{nodule_1}, z_{[i]}^{surface} - G_x^{nodule_1}) \quad (5)$$

That is, the extraction direction may be given by a direction connecting the barycenter to a particular point on a contour of the first region.

The extraction direction $D_{[i]}$ may be given by the weighted sum of the extraction direction determined based on the normal to the nodule surface (according to formula (3) or (4)) and the extraction direction determined based on the barycentric position of the nodule region (according to formula (5)) wherein at least one of the extraction directions is weighted. Note that the weighting is not essential in the determining the extraction direction, and the weighting may not be performed. That is, the extraction direction may be given by the normal direction at a particular point on the contour of the first region and the direction connecting the barycenter to the particular point on the contour of the first region. Alternatively, the extraction direction may be given by the sum of the normal direction and the direction connecting the barycenter of the first region and the particular point on the contour of the first region or the weighted sum of the normal direction and the direction connecting the barycenter of the first region and the particular point on the contour of the first region wherein the weighting is performed for at least one of the normal direction and the direction connecting the barycenter of the first region and the particular point on the contour of the first region.

In the present embodiment, in step S130, the local nodule mask image is cut out within the range centered at the barycentric position of the nodule region in the nodule mask image, and thus the barycenter of the nodule region is also located at the center of the local nodule mask image. Here, let $W_{Mnodule} \times H_{Mnodule} \times D_{Mnodule}$ denote the image size of the local nodule mask image, then $G^{nodule_1}$ is given by $G^{nodule_1} = (G^{nodule_1}_x, G^{nodule_1}_y, G^{nodule_1}_z) = (W_{Mnodule}/2, H_{Mnodule}/2, D_{Mnodule}/2)$. On the other hand, in a case where the nodule region is not located at the center of the local nodule mask image, the extraction range setting unit 114 may acquire the barycentric position $G^{nodule_1}$ of the nodule region in the local nodule mask image by applying the same process as the process performed in step S130 to the local nodule mask image.

The determining of the extraction direction $D_{[i]}$ using the barycentric position of the nodule region has an advantage that it is possible to properly determine the extraction direction $D_{[i]}$ regardless of a local change in the normal to the nodule surface. The nodule as a whole has a spherical or ellipsoidal shape. However, locally, the nodule surface has many small unevenesses. Therefore, if the extraction direction $D_{[i]}$ is determined based only on information associated with the nodule surface, there is a possibility that a small unevenness on the nodule surface may cause the determined extraction direction $D_{[i]}$ not to point to the nearby pleura.

However, the barycentric position of the nodule region is not influenced by small unevenesses on the nodule surface, and it is possible to stably acquire the barycentric position. Therefore, in the case where the extraction direction $D_{[i]}$ using the barycentric position of the nodule region, it is possible to eliminate the influence of the small unevenesses on the nodule surface as may be seen from formula (5). Thus, the extraction direction $D_{[i]}$ determined in this manner is expected to point to the nearby pleura.

Alternatively, the extraction range setting unit 114 may determine the extraction direction $D_{[i]}$ such that a direction is detected in which a minimum distance is obtained between a pixel of interest on the nodule surface and a pixel of the pleura region 431, and detected direction is employed as the extraction direction $D_{[i]}$. That is, the extraction direction $D_{[i]}$ may be determined based on the distance from a point of interest on the contour of the first region to the second region. More specifically, the extraction direction $D_{[i]}$ may be given by a direction that results in a minimum distance between a point of interest on the contour of the first region to the second region.

The extraction direction $D_{[i]}$ determined via the process described above is stored, by the extraction range setting unit 114, in the storage unit 130.

Step S180

In step S180, the extraction range setting unit 114 sets an extraction range for a pixel $P^{surface}_{[i]}$ on the nodule surface. Referring to FIG. 5C, the setting of the extraction range is described below. In the example shown in FIG. 5C, it is assumed that a pixel 521 is a pixel being currently of interest, $P^{surface}_{[i]}$, on the nodule surface. That is, in the present step, the extraction range setting unit 114 sets the extraction range for the pixel 521. In FIG. 5C, an arrow 522 indicates the extraction direction $D_{[i]}$ set in step S170.

In the image processing apparatus 100 according to the present embodiment, for example, the extraction range is given by a region expanding from a starting point defined at a pixel $P^{surface}_{[i]}$ on the nodule surface within a range of an angle (an extraction angle) with respect to the extraction direction $D_{[i]}$. That is, the extraction range setting unit 114 limits the range within which to extract the third region to a range having a particular width with respect to a direction determined based on the first region.

More specifically, the extraction range is defined as a region which extends from a starting point given at a pixel on the nodule surface and whose width increases in the extraction direction. That is, the extraction range setting unit 114 expands the width as approaching the second region. In the following discussion, it is assumed by way of example that the extraction range setting unit 114 sets a conical region as the extraction range.

First, the extraction range setting unit 114 acquires a value θ of an extraction angle from the data server 140. Details of the extraction angle will be described later.

Next, the extraction range setting unit 114 puts a boundary that defines the extraction range. The boundary is put such that the boundary is located outside the nodule region and inside the lung field region and such that the boundary makes an angle equal to the extraction angle θ with the extraction direction. That is, the extraction range setting unit 114 is an example of a limiting unit configured to limit extracting a third region, connecting the first region and the second region, within a range including a direction determined based on the first region. Note that the third region is a region indicating the pleural indentation. Referring to FIG. 5C, the method of setting the extraction range is described below. A line segment 523 and a line segment 524 represent the boundary defining the extraction range. The line segment 523 and the line segment 524 are set such that each line segment extends from the starting point defined by the pixel 521 being currently of interest and such that each line segment is located outside the nodule region and inside the lung field region. Furthermore, the line segment 523 and the line segment 524 are set such that the line segment 523 and the line segment 524 each makes an angle equal to the extraction angle θ with the extraction direction 522. In FIG. 5C, an angle 525 and an angle 526 are each equal to the extraction angle θ.

After setting the boundary defining the extraction range, the extraction range setting unit 114 sets the extraction range. The extraction range is given by a region surrounded by the pleura region and the boundary defining the boundary. In the example shown in FIG. 5C, the extraction range is given by a range 528 surrounded by the pleura region 527 in the local pleura mask image and the line segment 523 and the line segment 524 extending from the starting point defined by the pixel 521. The acquired extraction range is stored in the storage unit 130.

Because of the restriction on the drawing, the extraction range 528 is represented by a sector in FIG. 5C. However, the images currently under the process are all three-dimensional, and thus the extraction range 528 actually has the form of a cone whose apex is located at the pixel 521. In a case where the image under the process is two-dimensional, the extraction range 527 is given by a sector whose apex is located at the pixel 521. In the example shown in FIG. 5C, the extraction range has a shape symmetrical about the extraction direction $D_{[i]}$. However, the shape of the extraction range does not need to be symmetrical. For example, the extraction range may have an asymmetric shape depending on the location of the nodule in the lung field region and/or the direction defined by the extraction direction $D_{[i]}$. In a case where the extraction range has an asymmetric shape, the angle 525 and the angle 526 are different from each other.

The extraction angle is described in further detail below. In the image processing apparatus 100 according to the first embodiment, the same extraction angle is used for all pixels on the nodule surface. The extraction angle is stored in the data server 140. Thus, first, in step S180, the extraction range setting unit 115 acquires the extraction angle from the data server 140. Thereafter, the extraction range setting unit 115 sets the extraction range as described above.

Next, a method of determining the extraction angle is described. The extraction angle may be determined, for example, by using a plurality of learning images collected in advance. Note that the learning images are images each including a pleural indentation. The image processing apparatus 100 acquires a point (a nodule edge) on an edge of a nodule and a point (a pleura edge) on an edge of a pleura for a pleural indentation included in each learning image. Note that the nodule edge and the pleura edge may be determined by a user. The image processing apparatus 100 determines the extraction direction $D_{[i]}$ at the nodule edge in the method employed in step S170 described above. After determining the extraction direction $D_{[i]}$, the image processing apparatus 100 determines the angle between the extraction direction $D_{[i]}$ and the direction from the nodule edge to the pleura edge. By this stage of the process, the location of each pleura edge seen from the nodule edge has been represented by the angle from the extraction direction $D_{[i]}$ for each pleural indentation of all learning images. Next, based on the obtained angles, the image processing apparatus 100 determines the value of the extraction angle. Here, let $\theta_{min}$ and $\theta_{max}$ respectively denote the minimum value and the maximum value of the obtained angles. First, the image processing apparatus 100 selects one value from a range [$\theta_{min}$, $\theta_{max}$]. Thereafter, the process from step S110 to S200 performed by the image processing apparatus 100 according to the first embodiment is applied to all nodules of the learning images thereby actually extracting the pleural indentation region. In extracting the pleural indentation region in this process, the temporal extraction angle selected earlier is used. After the extraction, the image processing apparatus 100 calculates the extraction accuracy of the pleural indentation region for the temporal extraction angle. This process is performed for various values in the range [$\theta_{min}$, $\theta_{max}$], and, for each value, the image processing apparatus 100 determines the extraction accuracy of the pleural indentation region. Note that the extraction accuracy may be judged by a user. The image processing apparatus 100 detects an extraction angle that results in a highest extraction accuracy, and employs the detected extraction angle as the extraction angle used in step S180. Note that the extraction angle used in step S180 may be selected by user. The extraction angle obtained as a result of the process described above is stored in the data server 140. Note that it is sufficient to perform, only once, the above-described process of determining the extraction angle, for example, when the image processing apparatus 100 according to the first embodiment is built, and it is not necessary to perform the process when the original image is processed.

In the discussion above, it is assumed by way of example that the extraction range has a conical shape (a sectoral shape in a case where the original image is a two-dimensional image). However, the shape of the extraction range is not limited to the cone (the sector). For example, the extraction range may have the shape of a pyramid such as a triangular pyramid, a quadrangular pyramid, or the like. In this case, the pyramid may be set such that its apex is located at the pixel $P^{surface}_{[i]}$ on the nodule surface and the extraction direction $D_{[i]}$ forms a normal to the base of the pyramid. Furthermore, the size of the base (the spread angle of the extraction range) is defined by the extraction angle. Alternatively, the extraction range may be defined by a rectangular parallelepiped (a rectangle in a case where the original image is a two-dimensional image) one axis of which is given in the extraction direction $D_{[i]}$. Also in this case, the size of the base may be defined by the extraction angle.

Alternatively, the extraction range may have a shape represented by a quadratic surface (an elliptic paraboloid, a hyperboloid, or the like) which is open in the extraction direction $D_{[i]}$ starting from the pixel $P^{surface}_{[i]}$ on the nodule surface. In this case, the extraction range is represented not by an extraction angle but by coefficients in a mathematical expression of the quadratic surface. More specifically, for example, the extraction range is represented by coefficients (a, b, c, d, e, f, g, h, i, and j) in an equation $ax^2+by^2+cz^2+2dxy+2eyz+2fzx+2gx+2hy+2iz+j=0$. In a case where the original image is a two-dimensional image, the extraction range may be given by a region surrounded by a quadratic curve (a parabola, a hyperbolic curve, or the like). In this case, the extraction range is represented by coefficients (a, b, c, d, e, f) of equation $ax^2+by^2+2cxy+2dx+2ey+f=0$.

Step S190

In step S190, the extraction range setting unit 114 confirms that the pleura exists in the extraction range. In this step, first, the extraction range setting unit 114 sets a range in which the existence of the pleura is to be confirmed. Hereinafter, this range is referred to as a pleura existence confirmation range. Next, the extraction range setting unit 114 confirms that the pleura region acquired in step S120 exists within the pleura existence confirmation range. In a case where the pleura region exists within the pleura existence confirmation range, the image processing apparatus 100 performs step S200. Conversely, in a case where the pleura region does not exist within the pleura existence confirmation range, the image processing apparatus 100 performs step S150. That is, in a case where the second region does not exist in the range for extracting the third region, the extraction unit does not extract the third region.

A specific example of the process is described below. In FIG. 5C, the extraction range 528 has been set in step S180 for the pixel 521 of the image 520. In step S190, first, the extraction range setting unit 114 expands the extraction range 528 in the extraction direction 522 until an edge of the image is reached. More specifically, the boundary 523 and the boundary 524 defining the extraction range 528 are extended until they reach the edge of the image. An image 600 in FIG. 6A shows a manner in which the boundary 523 and the boundary 524 are extended. In the image 600, a pixel 601, an extraction direction 602, a boundary 603 of the extraction range, a boundary 604 of the extraction range, and an extraction range 605 are respectively the same as corresponding elements in the image 520, that is, the pixel 521, the extraction direction 522, the boundary 523, the boundary 524, and the extraction range 528. Note that a thick line 606, a thick line 607, and a thick line 608 are the pleura region acquired in step S120. In step S190, the extraction range setting unit 114 extends the boundary 523 (the boundary 603 in FIG. 6A) and the boundary 524 (the boundary 604 in FIG. 6A) thereby obtaining extended boundaries 609 and 610. As a result of the extending of the boundaries, a new region 611 surrounded by the boundary 609 and the boundary 610 is created. The resultant region 611 and the extraction range 605 define a pleura existence confirmation range.

Next, the extraction range setting unit 114 confirms that at least one of the pleura region 606, the pleura region 607, and the pleura region 608 exists in the pleura existence confirmation range (the region 605 plus the region 611). In the present example shown in FIG. 6A, the pleura region 607 exists in the pleura existence confirmation range. Therefore, the extraction range setting unit 114 determines that a pleura region exists in the pleura existence confirmation range. After the end of the present step, the image processing apparatus 100 performs step S200.

For a comparison, to provide a better understanding of effects of step S190, FIG. 6B illustrates an example in which no pleura region exists in the pleura existence confirmation range. In an image 620 shown in FIG. 6B, a pleura existence confirmation range 622 is set for a pixel 621. Any part of a pleura region 623 does not exist in the pleura existence confirmation range 622. In such a case, the extraction range setting unit 114 determines that no pleura region exists in the pleura existence confirmation range, and thus, after the end of the present step, the image processing apparatus 100 performs step S150.

Step S200

In step S200, the pleura indentation extraction unit 115 extracts a pleural indentation region existing in the local image. In the local image (the CT image), the pleural indentation is drawn as a line-shaped structure or a plane-shaped structure having a fixed pixel value. Therefore, the pleura indentation extraction unit 115 extracts the pleural indentation region, for example, using a region growth method. Note that the pleura indentation extraction unit 115 may use one of various methods other than the region growth method.

In the region growing method, a growth start point is set at a pixel $P^{surface}_{[i]}$ on the nodule surface. Growth conditions to be satisfied here include following three conditions. Condition 1: A candidate pixel for growth exists in a lung field region in a local lung field mask image. Condition 2: The pixel value of the candidate pixel for growth is within a particular range. Condition 3: The candidate pixel for growth exists within the extraction range set in step S180. Of these conditions, in particular, the condition 3 is a condition characterizing the pleural indentation extraction process according to the present embodiment. Condition 3 indicates that the pleura indentation extraction unit 115 is to extract the pleural indentation region within the extraction range set in step S180. That is, the pleura indentation extraction unit 115 is an example of an extraction unit configured to extract the third region within the range limited by the limiting unit. Note that a growth stop condition is that there is no candidate pixel for growth.

After the region growth process is completed, the pleura indentation extraction unit 115 determines whether the extracted region reaches the pleura region in the local pleura image. In a case where the extracted region reaches the pleura region, the pleura indentation extraction unit 115 employs the extracted region as a pleural indentation candidate region $M^{indentation}_{[i]}$ and further performs a process described below. Conversely, in a case where the extracted region does not reach the pleura region, the pleura indentation extraction unit 115 determines that no pleural indentation region exists, and returns to step S150 without performing the process described below. Note that the pleura indentation extraction unit 115 may execute the region growing method without using condition 3 of the growth conditions. In this case, the pleura indentation extraction unit 115 detects a region located within the extraction range from the whole region obtained as a result of the extraction by the region growth method, and the pleura indentation extraction unit 115 confirms that the detected region is in contact with the pleura region in the local pleural image.

After acquiring the pleural indentation candidate region $M^{indentation}_{[i]}$, the pleura indentation extraction unit 115 confirms that the acquired region is really a pleural indentation. The pleural indentation has a shape of a line or a plane. Based on this feature, the pleura indentation extraction unit 115 evaluates, for example, two judgement conditions to determine whether the pleural indentation candidate region $M^{indentation}_{[i]}$ is really a pleural indentation.

A first judgement condition is that the pleural indentation candidate region $M^{indentation}_{[i]}$ has a length smaller than a particular length. Here, of pixels belonging to $^{indentation}_{[i]}$, those pixels that are located on the edge of the pleura region are denoted by $P^{indentation}_{[i][j]}$ where j=1, 2, . . . , $N^{indentation}_{[i]}$ and $N^{indentation}_{[i]}$ is the number of pixels located on the edge of the pleura region. Furthermore, let dist(a, b; M) denote a function that returns, for given two points a and b in a mask region M, a minimum distance between the two points a and b in the mask region, then the length $Dist_{[i]}$ of $M^{indentation}_{[i]}$ is given by a formula (6) described below.

$$\text{Dist}_{[i]} = {}_{j \in \{1,2,\ldots,N_{[i]}^{indentation}\}}^{min} \text{dist}(P_{[i]}^{surface}, P_{[i][j]}^{indentation}; M_{[i]}^{indentation}) \quad (6)$$

When Dist[i] calculated according to formula (6) is smaller than the particular length $T^{indentation}$, the pleura indentation extraction unit 115 determines that the first judgement condition is satisfied.

The value of $T^{indentation}$ is determined, for example, from a plurality of learning images collected in advance. That is, the image processing apparatus 100 according to the present embodiment extracts a pleural indentation region existing in each learning image, and the image processing apparatus 100 detects a threshold value of $Dist_{[i]}$ that allows it to obtain the highest accuracy in extracting the pleural indentation region. The image processing apparatus 100 employs the detected threshold value as the $T^{indentation}$. Note that the threshold value of $Dist_{[i]}$ for obtaining the highest accuracy in extracting the pleural indentation region may be determined by the image processing apparatus 100 or by a user. This threshold value is stored, for example, in the data server 140.

A second judgement condition is that at each pixel belonging to the pleural indentation candidate region $M^{indentation}_{[i]}$, the rate of change in a region extending direction is smaller than a particular value. Here, let $P^{indentation}_{[i][j][k]}$ denote pixels that are, of pixels belonging to $M^{indentation}_{[i]}$, pixels located on a line extending starting from $P^{surface}_{[i]}$ to $P^{indentation}_{[i][j]}$ where k=1, 2, ..., dist($P^{surface}_{[i]}$, $P^{indentation}_{[i][j]}$; $M^{indentation}_{[i]}$). Next, the pleura indentation extraction unit 115 selects two pixels apart from each other by a distance corresponding to d pixels (d>0) from $P^{indentation}_{[i][j][k]}$, and determines extending directions $v^1_{[i][j][k]}$ and $v^2_{[i][j][k]}$ of $M^{indentation}_{[i]}$ in $P^{indentation}_{[i][j][k]}$ where $v^1_{[i][j][k]}$ is given by $v^1_{[i][j][k]} = P^{indentation}_{[i][j][k]} - P^{indentation}_{[i][j][k]}$, and $v^2_{[i][j][k]}$ is given by $v^2_{[i][j][k]} = P^{indentation}_{[i][j][k]} - P^{indentation}_{[i][j][k-d]}$. The rate of change is calculated from $v^1_{[i][j][k]}$ and $v^2_{[i][j][k]}$ according to formula (7) described below.

$$\theta_{[i]} = \max_{j \in \{1,2,\ldots,N^{indentation}_{[i]}\}} \max_{k \in \{1,2,\ldots,dist(P^{surface}_{[i]}, P^{indentation}_{[i][j]}; M^{indentation}_{[i]})\}} \cos^{-1}\left(\frac{v^1_{[i][j][k]} \cdot v^2_{[i][j][k]}}{|v^1_{[i][j][k]}| |v^2_{[i][j][k]}|}\right) \quad (7)$$

In a case where $\theta_{[i]}$ calculated according to formula (7) is smaller than a predetermined value $T^{direction}$, the pleura indentation extraction unit 115 determines that the second judgment condition is satisfied. The value of $T^{direction}$ is determined, as with the value of $T^{indentation}$, for example, from a plurality of learning images collected in advance.

The pleura indentation extraction unit 115 evaluates the two judgment conditions described above for the pleural indentation candidate region $M^{indentation}_{[i]}$. In a case where the two judgment conditions are satisfied, the pleura indentation extraction unit 115 regards the pleural indentation candidate region $M^{indentation}_{[i]}$ as a pleural indentation. Although in the present embodiment, the two judgment conditions are employed in the judgment on the pleural indentation, only one of the two judgment conditions may be used, or other judgment conditions may be used. Depending on the required extraction accuracy, the judgment conditions described above may not be used.

Finally, the pleura indentation extraction unit 115 stores the acquired pleural indentation region $M^{indentation}_{[i]}$ in a mask image (a local pleural indentation mask image). The produced local pleural indentation mask image is stored in the storage unit 130.

Step S210

After the process from step S150 to step S200 has been performed repeatedly until all pixels on the nodule surface have been processed, the image size changing unit 112 acquires, in step S210, the local pleural indentation mask image from the storage unit 130. The image size changing unit 112 then changes the size of the local pleural indentation mask image to an image size equal to that of the original image. Note that in a case where the process in step S130 is not performed, it is not necessary to perform step S210.

Here, let it be assumed that in step S130, a local image is produced by cutting out a rectangular parallelepiped range whose diagonal is defined by two points $(x_1, y_1, z_1)$ and $(x_2, y_2, z_2)$ in the original image where $x_1, x_2, y_1, y_2, z_1, z_2$ are positive integers satisfying $1 <= x_1 < x_2 <= W_I$, $1 <= y_1 < y_2 <= H_I$, and $1 <= z_1 < z_2 <= D_I$. $W_I$, $H_I$, and $D_I$ denote the numbers of pixels of the original image as counted in the X, Y, and Z directions, respectively.

In the present step, first, the image size changing unit 112 produces a mask image with an image size $W_I \times H_I \times D_I$ equal to the image size of the original image. The pixel values of the mask image are all given as pixels outside the pleural indentation. Next, the image size changing unit 112 copies the pixels value of the local pleural indentation mask image into the mask image in a rectangular parallelepiped range whose diagonal extends between $(x_1, y_1, z_1)$ and $(x_2, y_2, z_2)$. Finally, the image size changing unit 112 stores the obtained mask image (the pleural indentation mask image) in the storage unit 130.

According to the procedure described above, the image processing apparatus 100 of the first embodiment performs the pleura indentation extraction process.

In the image processing apparatus 100 according to the first embodiment, the extraction range is limited based on the feature of the pleural indentation, and thus it is possible to extract a pleural indentation region from an image with high accuracy compared with the conventional techniques. More specifically, in the image processing apparatus 100 according to the first embodiment, the extraction direction is set for each pixel on the nodule surface, and the extraction range is set based on the extraction direction. The pleural indentation region is then extracted within the extraction range. The extraction direction is set using the normal to the nodule surface and the barycenter of the nodule region. In the case where the extraction direction is set in this manner, at each pixel on the nodule surface, the extraction direction is expected to point to a nearby part of the pleura. The extraction range is defined as a region which extends starting from a pixel on the nodule surface and which expands in width as extending in the extraction direction. The extraction direction and the extraction range set in the above-desried manner properly cover a region in which there is a high probability that a pleura indented by the nodule (a pleural indentation) exists. Furthermore, in the image processing apparatus 100 according to the present embodiment, the pleura existence confirmation range is set based on the extraction region, and a pleural indentation region is extracted only when a pleura exists within the pleura existence confirmation range. By performing the process described above, the image processing apparatus 100 according to the present embodiment is capable of distinguishing the pleural indentation from other anatomical structures existing around the nodule, and thus the image processing apparatus 100 is capable of extracting the pleural indentation region from the image with high accuracy.

Modifications

The image processing apparatus 100 described above cuts out a part of the original image in step S130 and extracts a pleural indentation region from a cut-out image (a local image). The image processing apparatus 100 stores the extracted pleural indentation region in the form of a mask image (a local pleural indentation mask image) and reconstructs the mask image having the same size as the size of the original image thereby extracting the pleural indentation region in the original image.

The process in step S130 is performed to reduce the amount of data stored in the storage unit 130 or to reduce the calculation time spent to perform the image processing. However, the process in step S130 is not essential from the point of view of effects of the image processing apparatus according to the first embodiment. Therefore, in a case where the necessity for reducing the computer resource is not high, the image processing apparatus 100 may not perform the process in step S130. That is, the image processing apparatus 100 does not necessarily need to include the image size changing unit 112. Thus, in a modification described below, the image processing apparatus does not include the image size changing unit 112. In this modification, the image processing apparatus has a similar configuration to that of the image processing apparatus 100 except that the image size changing unit 112 is removed.

In a case where the process in step S130 is not performed, the extraction process control unit 113, the extraction range setting unit 114, and the pleura indentation extraction unit 115 of the image processing apparatus according to the present modification process the image, the lung field mask image, the nodule mask image, and the pleura mask image in steps S140, S150, S160, S170, S180, S190, and S200. However, in the present modification, the image processing apparatus 100 does not perform the process in step S210.

Thus, in the present modification, the image processing apparatus is capable of distinguishing the pleural indentation from the other anatomical structures existing around the nodule without cutting out a part of an image (original image) representing the whole lung field region. Furthermore, the present modification makes it possible for the image processing apparatus to distinguish the pleural indentation from the other anatomical structures existing around the nodule even in a case where the original image includes only a nodule region and a part of the lung field region. Thus, it is possible to extract the pleural indentation region with high accuracy from such an image.

Second Embodiment

In a second embodiment described below, an image processing apparatus also sets an extraction range and extracts a pleural indentation within the extraction range. However, there are two differences from the image processing apparatus 100 according to the first embodiment. A first difference is in a method of setting the extraction range. In the image processing apparatus according to the second embodiment, the extraction range is determined based on a pixel on the nodule surface and the extraction direction and additionally based on the distance (the extraction distance) from the pixel on the nodule surface. The extraction distance is determined based on a feature of the nodule region. A second difference is in that the extraction range is directly used as a pleura existence confirmation range.

Figure 7:
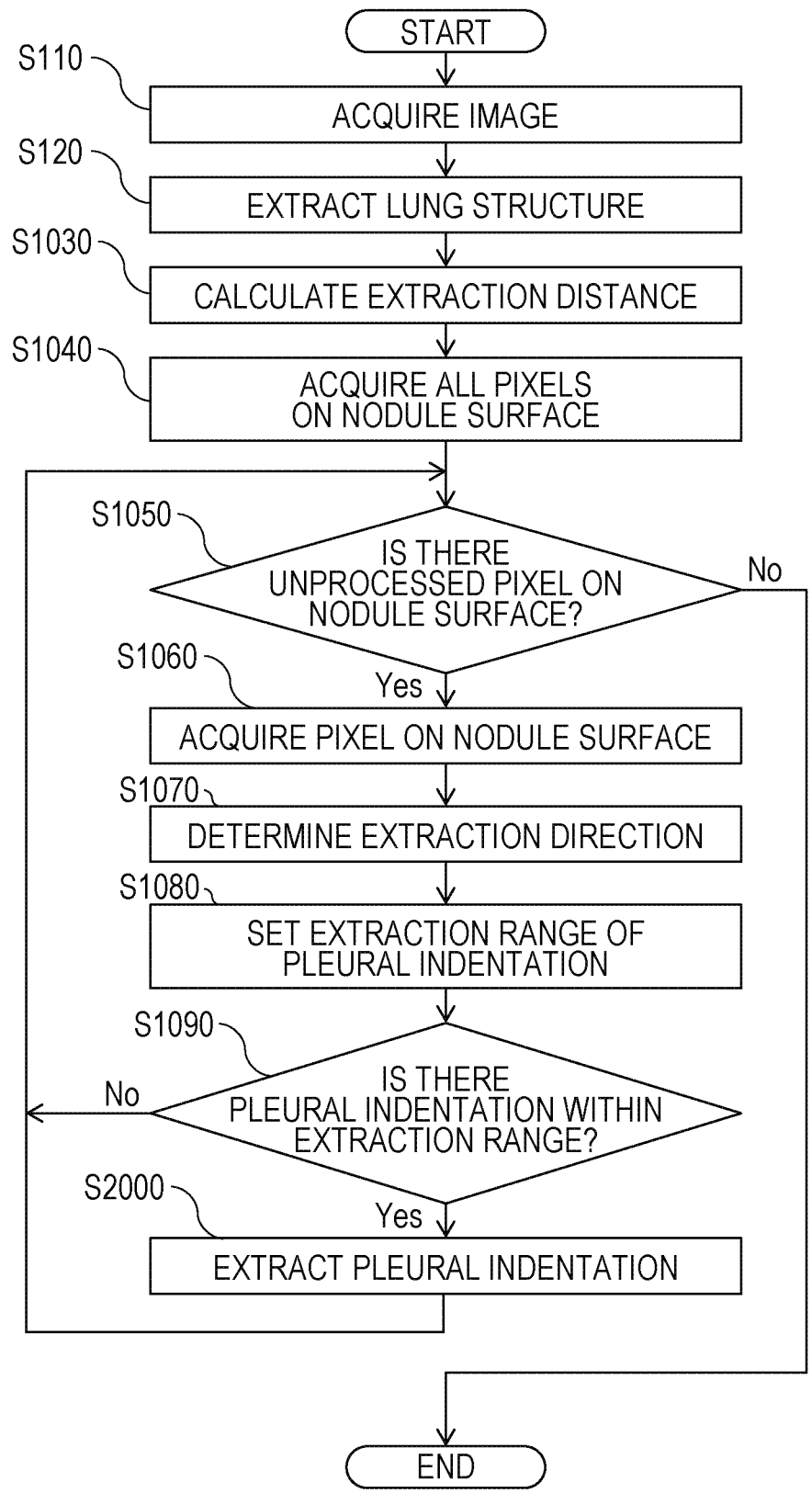
FIG. 7 is a flow chart illustrating an example of a procedure performed by the image processing apparatus according to the second embodiment.

The image processing apparatus according to the second embodiment is described in further detail below. The functional configuration of the image processing apparatus according to the present embodiment is similar to that of the image processing apparatus 100 according to the first embodiment. Referring to FIG. 7, an example of a processing procedure performed by the image processing apparatus according to the present embodiment is described below. In the present embodiment, the image processing apparatus performs steps S110 and S120 which are also performed by the image processing apparatus 100 according to the first embodiment. Thereafter, instead of performing step S130 (changing of the image size of the original image), step S1030 is performed as described below.

Step S1030

In step S1030, the extraction range setting unit 114 sets the extraction distance based on features of the nodule.

Of various features of the nodule, some features are related to the region in which the pleural indentation exists. One of such features is the radius of the nodule. In general, when the nodule is small, a part, close to the nodule, of a normal pleura is indented by the nodule. Conversely, when the nodule is large, the nodule indents not only a nearby part of the normal pleura but also a distant part of the normal pleura. Taking into account such a feature, in the example of the process in step S1030, the extraction distance is set based on the radius of the nodule. Note that another measure such as a diameter other than the radius may be employed as long as it is possible to indicate the size of the nodule. That is, the extraction range setting unit 114 determines the size of the range within which the third region is to be extracted, based on the feature (the size of the first region defined by its radius or diameter) of the first region.

First, the extraction range setting unit 114 calculates the average radius of the nodule from the nodule region in the nodule mask image. It is possible to calculate the average radius of the nodule using known simple image processing, and thus a further description thereof is omitted.

After the calculation of the average radius of the nodule, the extraction range setting unit 114 acquires, from the data server 140, a set of combinations of extraction distances and nodule radii ($R^{nodule}_{[k]}$, $R^{indentation}_{[k]}$) where k=1, 2, ..., $N_{set}$ and $N_{set}$ denotes the number of combinations of extraction distances and nodule radii stored in the data server 140. Between values ($R^{nodule}_{[k]}$, $R^{indentation}_{[k]}$), there is a relationship that when a nodule with a radius $R^{nodule}$ has a pleural indentation, a typical length of the pleural indentation is $R^{indentation}$. More specifically, as $R^{nodule}$ increases, $R^{indentation}$ increases. That is, the extraction range setting unit 114 increases the range within which the third region is to be extracted as the size of the first region increases.

A plurality of combinations of extraction distances and nodule radii having such a relationship are stored in the database 140 in advance, and the extraction range setting unit 114 acquires, in step S1030, ($R^{nodule}_{[k]}$, $R^{indentation}_{[k]}$).

Next, the extraction range setting unit 114 seeks a radius $R^{nodule}_{[k']}$ of the nodule closest to the average radius of the nodule by comparing each $R^{nodule}_{[k]}$ with the average radius of the nodule where 1<=k'<=$N_{set}$. The extraction range setting unit 114 then acquires $R^{indentation}_{[k']}$ associated with $R^{nodule}_{[k']}$. $R^{indentation}_{[k']}$ obtained in the above-described manner is employed as the extraction distance. The acquired extraction distance $R^{indentation}_{[k']}$ is stored in the storage unit 130.

The set of combinations of extraction distances and nodule radii ($R^{nodule}_{[k]}$, $R^{indentation}_{[k]}$) stored in the data server 140 is described in further detail below. The combinations of these values are determined, for example, from a plurality of learning images collected in advance. First, for each learning image, the extraction range setting unit 114 measures the radius of a nodule existing in the image and the length of a pleural indentation. The length of the pleural indentation is, for example, the distance between a nodule edge of the pleural indentation and a pleura edge. Next, the extraction range setting unit 114 classifies nodules according to nodule radii. For example, nodules whose radius is less than 5 mm are classified into group #1, nodules whose radius is in a range from 5 mm (inclusive) to 10 mm (exclusive) are classified into group #2, ..., nodules whose radius is in a range from 45 mm (inclusive) to 50 mm (exclusive) are classified into group #10, and nodules whose radius is larger than 50 mm (inclusive) are classified into group #11. After classifying all nodules according to radii, the extraction range setting unit 114 calculates the average length of the pleural indentation for each nodule group. The extraction range setting unit 114 creates a combination of the average length of pleural indentations and a representative value of the nodule radius for each group. The representative value of the nodule radius may be given, for example, by a medium in a range of the nodule radius according to which nodules are classified into the groups. For example, for nodules of group #2 (in which the nodule radius is in a range from 5 mm (inclusive) to 10 mm (exclusive)), $R^{nodule}_{[2]}=7.5$ mm. The extraction range setting unit 114 determines the combination of the representative value of the nodule radii and the average value of the lengths of the pleural indentations ($R^{nodule}_{[k]}$, $R^{indentation}_{[k]}$) sequentially for each group in the above-described manner, and stores the resultant set of combinations in the data server 140.

The process of setting the extraction distance based on the average radius has been described above. Next, another example of a process performed in step S1030 is described below for a case in which the extraction angle is set based on the average radius of nodules in addition to the extraction distance. In the case where the extraction angle is set based on the average nodule radius, the process is performed as follows. After the average nodule radius is calculated, the extraction range setting unit 114 acquires, from the data server 140, the set of combinations of three values in terms of the nodule radius, the extraction distance, and the extraction angle ($R^{nodule}_{[k]}$, $R^{indentation}_{[k]}$, $\theta_{[k]}$) where k=1, 2, . . . , $N_{set}$. After ($R^{nodule}_{[k]}$, $R^{indentation}_{[k]}$, $\theta_{[k]}$) is acquired, the process is performed in a similar manner to the case where the extraction distance is set based on the average radius. That is, a combination of values ($R^{nodule}_{[k']}$, $R^{indentation}_{[k']}$, $\theta_{[k']}$) corresponding to (or closest to) the average radius $R^{nodule}$ is detected, and the angle $\theta_{[k']}$ included in the detected combination of values is employed as the extraction angle where 1<=k'<=$N_{set}$. The acquired extraction angle $\theta_{[k']}$ is stored in the storage unit 130, and is used as the extraction angle in step S1080.

The values ($R^{nodule}_{[k]}$, $R^{indentation}_{[k]}$, $\theta_{[k]}$) stored in the data server 140 are determined, for example, from a plurality of learning images collected in advance. First, the extraction range setting unit 114 determines the values of $R^{nodule}_{[k]}$ and $R^{indentation}_{[k]}$ in a similar manner to the manner of determining ($R^{nodule}_{[k]}$, $R^{indentation}_{[k]}$). Next, the extraction range setting unit 114 determines the value of $\theta_{[k]}$ using the same method as the method used by the image processing apparatus 100 to determine the extraction angle according to the first embodiment. The details of this determination method have been described above in the description of step S1030. Note that in the determination of the value of $\theta_{[k]}$, a nodule belonging to group #k in which $R^{nodule}_{[k]}$ is the representative value thereof is used.

The process in step S1030 has been described above. Although in the example described above, the extraction distance and the extraction angle are determined based on the average nodule radius, only one of the extraction distance and the extraction angle may be determined. For example, the extraction range setting unit 114 may determine only one of the extraction distance and the extraction angle based on the average nodule radius, and may determine the extraction angle in a similar manner to that according to the first embodiment.

After the process in step S1030, the image processing apparatus performs steps S1040, S1050, and S1060 according to the second embodiment. The process in these steps are similar to the process in steps S140, S150, and S160 performed by the image processing apparatus 100 according to the first embodiment. However, in these steps, the original image, the lung field mask image, the nodule mask image, the pleura mask image are processed instead of the local image, the local lung field mask image, the local nodule mask image, and the local pleura mask image, because the process in step S130 (to change the image size of the original image) is not performed by the image processing apparatus according to the second embodiment.

After the process in steps S1040, S1050, and S1060, the image processing apparatus according to the second embodiment performs a process in step S1070 as described below.
Step S1070

In step S1070, the extraction range setting unit 114 sets the extraction direction $D_{[i]}$. In the image processing apparatus according to the second embodiment, the extraction direction is determined from a pixel on the nodule surface and a pixel, closest to this pixel, on the pleura.

Figure 8:
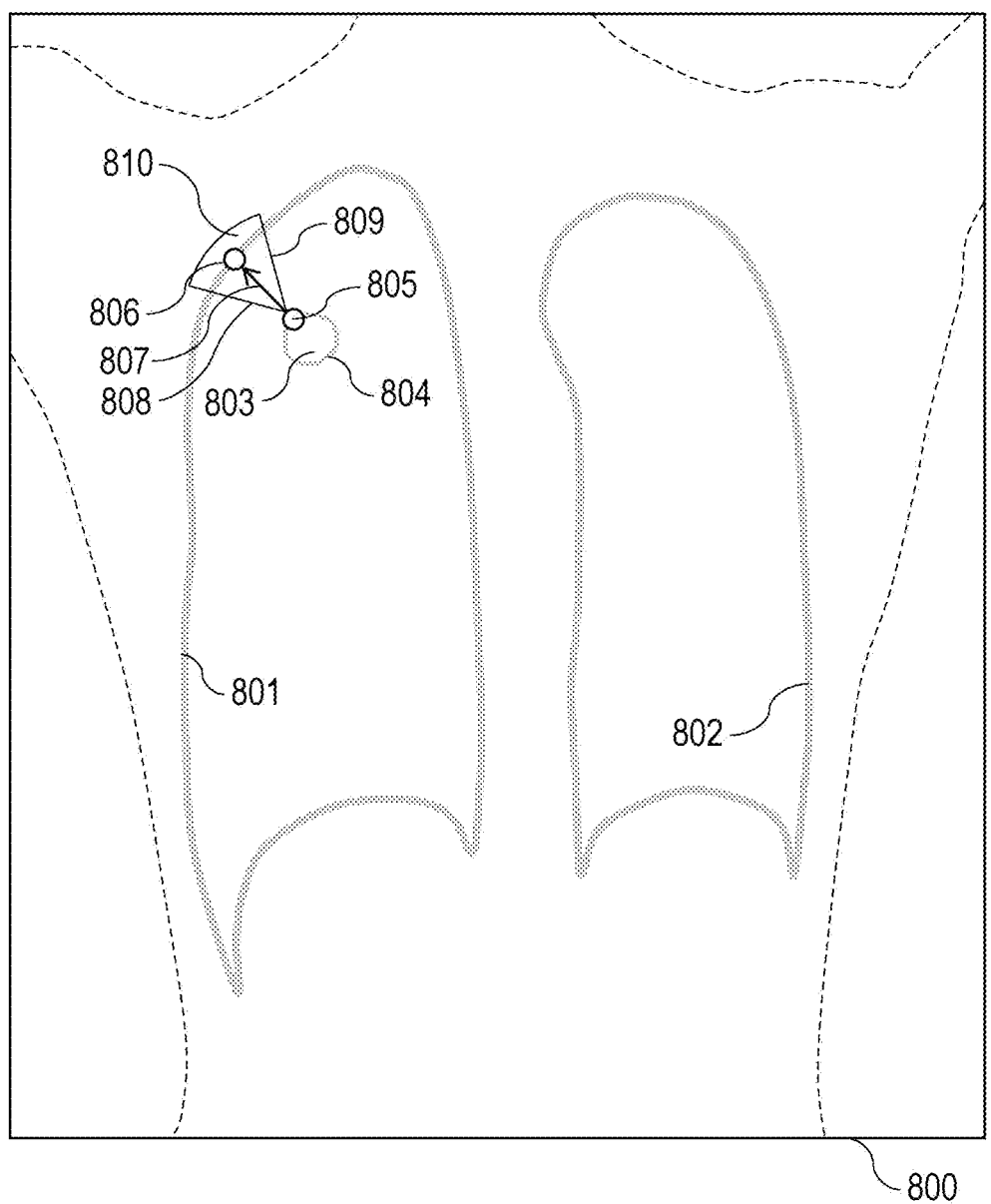
FIG. 8 is a schematic diagram illustrating an example of an extraction range set by an image processing apparatus according to a second embodiment.

Referring to FIG. 8, an example of a method of setting the extraction direction is described below. In an image 800 shown in FIG. 8, pleura regions 801 and 802 in a pleura mask image and a nodule region 803 in a nodule mask image, which are acquired in step S120, are displayed in a superimposed manner. A boundary line 804 of the nodule 803 is represented by boundary pixels acquired in step S1040.

Here let it be assumed that a pixel 805 is currently of interest in step S1060. The extraction range setting unit 114 seeks a pixel closest to the pixel of interest on the nodule surface from pixels in the pleura region. In the example shown in FIG. 8, the extraction range setting unit 114 seeks a pixel closest to the pixel 805 of interest from pixels in the pleura regions 801 and 802. As a result of this process, a pixel 806 in the pleura region 801 is detected as the pixel closes to the pixel 805 of interest.

Next, the extraction range setting unit 114 sets the extraction direction $D_{[i]}$. Here let $M^{pleura}$ denote the pleura region and let $P^{surface}_{[i]}$ denote the coordinate value of the pixel of interest (the pixel 805). Also let $P^{pleura}_{[l]}$ denote the coordinate value of the pixel (the pixel 806) closest to the pixel $P^{surface}_{[i]}$ where l=1, 2, . . . , #($M^{pleura}$) and #($M^{pleura}$) indicates the number of pixels belonging to the pleura region. Thus, the extraction direction $D_{[i]}$ given by $D_{[i]}=P^{pleura}_{[l]}-P^{surface}_{[i]}$. In the example shown in FIG. 8, an arrow 807 extending from the pixel 805 to the pixel 806 indicates the extraction direction $D_{[i]}$.

The process in step S1070 has been described above.

After the process in step S1070, a process in steps S1080 and S1090 is performed as described below without performing the process in step S180 and S190.
Step S1080

In step S1080, the extraction range setting unit 114 sets the extraction range. In the image processing apparatus according to the second embodiment, the extraction range setting unit 114 determines the extraction range based on a pixel on the nodule surface and the extraction direction and additionally based on the extraction distance calculated in step S1030.

Referring to FIG. 8, an example of a process of setting the extraction range is described below. In step S1070, the extraction direction $D_{[i]}$ has been set. In FIG. 8, the arrow 807 indicates the extraction direction $D_{[i]}$.

First, the extraction range setting unit 114 acquires an extraction angle. In a case where the extraction angle has been set in step S1030 based on the nodule radius, the value of the extraction angle has been stored in the storage unit 130. Therefore, the extraction range setting unit 114 acquires the extraction angle from the storage unit 130. Conversely, in a case where the setting of the extraction angle in step S1030 is not performed, the extraction angle stored in the data server 140 is employed in a similar manner as in the process in step S180 performed by the image processing apparatus 100 according to the first embodiment. Thus, the extraction range setting unit 114 acquires the extraction angle from the data server 140.

Next, the extraction range setting unit 114 acquires the extraction distance from the storage unit 130.

After the extraction angle and the extraction distance are acquired, the extraction range setting unit 114 sets the boundary defining the extraction range. The boundary is set such that the angle with respect to the extraction direction $D_{[t]}$ is equal to the extraction angle. In the example shown in FIG. 8, the arrow 807 indicates the extraction direction $D_{[t]}$, and the line segment 808 and the line segment 809 indicate the boundaries. The line segment 808 is set such that the angle between the arrow 807 and the line segment 808 is equal to the extraction angle. Similarly, the line segment 809 is set such that the angle between the arrow 807 and the line segment 809 is equal to the extraction angle. Furthermore, the extraction range setting unit 114 sets the length of the boundary (the line segment 808 and the line segment 809) defining the extraction range to be equal to the extraction distance acquired in step S1030.

Finally, the extraction range setting unit 114 sets the extraction range. By this stage of the process, the boundary (the line segment 808 and the line segment 809) defining the extraction range has been set, and thus the region surrounded by the boundary is employed as the extraction range. Note that the extraction range is limited to a range from a pixel on the nodule surface to a distance equal to the extraction distance. In the example shown in FIG. 8, a region 810 is employed as the extraction range. As may be seen from FIG. 8, the extraction range 810 is the region surrounded by the line segment 808 and the line segment 809, and the region is within the range of the extraction distance from the pixel 805 of interest.

The process in step S1080 has been described above.

Step S1090

In step S1090, the extraction range setting unit 114 sets the pleura existence confirmation range and confirms that a pleura exists within this pleura existence confirmation range. In a case where a pleura region exists within the pleura existence confirmation range, step S2000 is performed, but otherwise step S1050 is performed. Note that in the image processing apparatus according to the second embodiment, the extraction range set in the step S1080 is directly used as the pleura existence confirmation range without extending the extraction range in the extraction direction.

Depending on a result of the judgment process in step S1090, the image processing apparatus according to the second embodiment performs the process in step S2000. Note that the process in step S2000 is similar to the process in step S200 performed by the image processing apparatus 100 according to the first embodiment except that the images subjected to the process in step S2000 are not the local image, the local lung field mask image, the local nodule mask image, and the local pleura mask image but the original image, the lung field mask image, the nodule mask image, and the pleura mask image.

According to the procedure described above, the image processing apparatus of the second embodiment performs the process.

In the image processing apparatus according to the second embodiment, the extraction range of the pleural indentation is set based on the size of the nodule, and thus it is possible to extract the pleural indentation region with high accuracy. More specifically, in the image processing apparatus according to the second embodiment, the extraction direction is set along a direction indicated by a vector whose starting point is located at the pixel of interest on the nodule surface and whose end point is located at a pleura pixel closest to the pixel of interest on the nodule surface. When the extraction direction is set at an arbitrary pixel on the nodule surface in the above-described manner, the resultant extraction direction points to a nearby part of the pleura. The extraction range is limited to the range from the pixel on the nodule surface to the particular distance (the extraction distance). The extraction distance is given by the typical pleural indentation length. When the extraction direction and the extraction range are set in the above-described manner, the resultant extraction range properly covers a region in which there is a high probability that the pleura indented by the nodule (the pleural indentation) exists. Furthermore, because the extraction range is limited to the typical pleural indentation length, the extraction range does not cover a region in which no pleural indentation exists. Furthermore, as for the pleura existence confirmation range, the same range as the extraction region is employed. Therefore, in the image processing apparatus according to the second embodiment, the extraction of the pleural indentation region is not performed in a region in which the distance from the nodule to the pleura is greater than the typical pleural indentation length. In the image processing apparatus according to the present embodiment, performing the process described above makes it possible to distinguish the pleural indentation from the other anatomical structures existing around the nodule in the image (the original image) in which the whole lung field region is displayed. Furthermore, in the image processing apparatus according to the present embodiment, it is possible to distinguish the pleural indentation from the other anatomical structures existing around the nodule even in a case where the original image includes only a nodule region and a part of the lung field region. Thus, it is possible to extract the pleural indentation region with high accuracy from such an image.

Modifications

The image processing apparatus according to the second embodiment has been described above for the case where the process of changing the image size of the original image in step S130, which is performed by the image processing apparatus 100 according to the first embodiment, is not performed. However, performing the process in step S130 does not cause the effects of the image processing apparatus according to the second embodiment to be lost. Therefore, the process in step S130 may be performed as necessary. Thus, in a modification, the process in S130 is performed by the image processing apparatus after steps S110 and S120 are performed. Thereafter, in this modification, the image processing apparatus sequentially performs steps S1030, S1040, S1050, S1060, S1070, S1080, S1090, and S2000. However, in the process from step S1030 to step S2000, the local image, the local lung field mask image, the local nodule mask image, and the local pleura mask image are subjected to the process. Finally, in the present modification, the image processing apparatus performs the same process as the process in step S210 performed by the image processing apparatus 100 according to the first embodiment.

Thus the method according to the present modification makes is possible for the image processing apparatus to distinguish the pleural indentation from the other anatomical structures existing around the nodule in the image (the original image) in which the whole lung field region is displayed, and thus the image processing apparatus is capable of extracting the pleural indentation region with high accuracy.

Finally, examples of applications of the image processing apparatus according to the first or second embodiment or one of the modifications are described below. The image processing apparatus may be used as a part of the technique (the CAD technique) for assisting doctors in image interpretation. For example, the pleural indentation region acquired by the image processing apparatus may be superimposed on the original image, or a mark indicating a location of the pleural indentation region may be displayed on the original image thereby allowing a doctor to recognize the location. This allows the doctor to perform the image interpretation without missing the pleural indentation that actually exists in the original image.

The information obtained by the image processing apparatus as to whether there is a pleural indentation may be transferred to a differential diagnosis system to diagnose whether the nodule is benign or malignant. The differential diagnosis system judges whether the nodule of interest is benign or malignant based on the information indicating whether there is a pleural indentation or not, an image feature obtained from a medical image, clinical data such as clinical information on a patient, etc., and the differential diagnosis system provides a judgment result to a doctor. This allows the doctor to make a differential diagnosis of a pulmonary nodule with high accuracy.

The information obtained by the image processing apparatus as to whether there is a pleural indentation may be transferred to an automatic image interpretation report generation system. The automatic image interpretation report generation system describes the received information, in an image interpretation report, as to whether there is a pleural indentation. This allows a reduction in time spent by a doctor to write the image interpretation report.

In the image processing apparatus described above, the extraction range is determined based on the extraction direction and the extraction angle. However, the extraction range may be determined based on the distance between the nodule and the pleura. In this case, for example, the extraction range setting unit 114 calculates the distance between a pixel on the nodule surface and a pixel on the pleura, and determines a range within which the distance is smaller than a threshold value and employs this range as the extraction range. That is, the extraction range setting unit 114 limits the extraction of the third region connecting between the first region and the second region within a range in which the distance between the first region and the second region is equal to or smaller than a threshold value.

This allows a reduction in probability that a structure that connects a pixel on the nodule surface and a distant pleura is erroneously extracted as the pleural indentation. That is, it becomes possible to extract the pleural indentation region with high accuracy.

In the image processing apparatus described above, a pixel on the nodule surface is used as a starting point. However, the starting point is not limited to one of pixels on the nodule surface. For example, a pixel at a location shifted inward by a distance corresponding to a few pixels from the nodule surface may be employed as a starting point. Also in this case, it is possible to achieve effects similar to those described above.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-256154 filed Dec. 28, 2016, which is hereby incorporated by reference herein in its entirety.

What is claimed is:

1. An information processing apparatus comprising:
at least one memory storing instructions; and
at least one processor that, when executing the instructions, causes the information processing apparatus to perform operations comprising;
acquiring, in a medical image, a first region and a second region different from the first region, the first region and the second region not attached to each other;
limiting extracting a third region, connecting the first region and the second region, and different from the first region and the second region, within a range including an extraction direction determined based on the first region; and
extracting the third region within the range limited by the limiting.

2. The information processing apparatus according to claim 1, wherein the limiting includes setting the extraction direction in a direction of a normal to a contour of the first region.

3. The information processing apparatus according to claim 1, wherein the limiting includes determining the extraction direction based on a barycenter of the first region.

4. The information processing apparatus according to claim 3, wherein the limiting includes determining the extraction direction based on a direction of a normal at a particular point on a contour of the first region and a direction from the barycenter to the particular point.

5. The information processing apparatus according to claim 4, wherein the limiting includes setting the extraction direction to a direction given by a sum of the normal direction and the direction from the barycenter to the particular point or given by a weighted sum of the normal direction and the direction from the barycenter to the particular point in which one or more of the normal direction and the direction from the barycenter to the particular point is weighted.

6. The information processing apparatus according to claim 3, wherein the limiting includes employing, as the extraction direction, the direction from the barycenter to the particular point on the contour of the first region.

7. The information processing apparatus according to claim 1, wherein the limiting includes determining the extraction direction based on a distance from the particular point on the contour of the first region to the second region.

8. The information processing apparatus according to claim 7, wherein the limiting includes employing, as the extraction direction, a direction in which the distance from the particular point on the contour of the first region to the second region becomes minimum.

9. The information processing apparatus according to claim 1, wherein the limiting limits the range within which to extract the third region to a range including a particular width with respect to the extraction direction.

10. The information processing apparatus according to claim 9, wherein the limiting includes increasing the particular width as approaching the second region.

11. The information processing apparatus according to claim 1, wherein the limiting includes determining a size of the range within which to extract the third region based on a feature of the first region.

12. The information processing apparatus according to claim 11, wherein the limiting includes determining the size of the range within which to extract the third region based on a size of the first region.

13. The information processing apparatus according to claim 12, wherein the size of the first region is defined by a radius or a diameter of the first region.

14. The information processing apparatus according to claim 12, wherein the limiting includes increasing the size of the range within which to extract the third region as the size of the first region increases.

15. The information processing apparatus according to claim 1, wherein in a case where the second region does not exist in the range within which to extract the third region, the extraction of the third region is not performed by the extracting.

16. The information processing apparatus according to claim 1, wherein the first region is a region indicating a nodule, the second region is a region indicating a pleura, and the third region is a region indicating the pleural indentation.

17. The information processing apparatus according to claim 1, wherein the medical image is an image indicating a part of a right or left lung field.

18. The information processing apparatus according to claim 1, wherein the medical image is an image indicating at least a whole right lung field or a whole left lung field.

19. An extraction method comprising:
acquiring, in a medical image, a first region and a second region different from the first region, the first region and the second region not attached to each other;
determining an extraction direction based on the first region;
limiting extracting a third region, connecting the first region and the second region, and different from the first region and the second region, within a range including the extraction direction; and
extracting the third region within the limited range, wherein determining the extraction direction, limiting extracting the third region, and extracting the third region are performed for each of pixels on a contour of the first region,
wherein at least one processor is configured to be in communication with at least one memory to perform the operations of acquiring, determining, limiting, and extracting.

20. A non-transitory computer-readable storage medium storing a program, the program causing a computer to execute a method, the method comprising:
acquiring, in a medical image, a first region and a second region different from the first region, the first region and the second region not attached to each other;
determining an extraction direction based on the first region;
limiting extracting a third region, connecting the first region and the second region, and different from the first region and the second region, within a range including the extraction direction; and
extracting the third region within the limited range, wherein determining the extraction direction, limiting extracting the third region, and extracting the third region are performed for each of pixels on a contour of the first region.

21. An information processing apparatus comprising:
at least one memory storing instruction; and
at least one processor that when executing the instructions, causes the information processing apparatus to perform operations comprising;
acquiring in a medical image, a first region and a second region different from the first region, the first region and the second region not attached to each other;
limiting extracting a third region, connecting the first region and the second region, within a range in which a distance between the first region and the second region is less than or equal to a threshold value; and
extracting the third region within the range limited by the limiting.

22. An information processing apparatus comprising:
at least one memory storing instruction; and
at least one processor that when executing the instructions, causes the information processing apparatus to perform operations comprising;
limiting a region within which to extract a pleural indentation region, based on a medical feature of a pleural indentation, within a part of a region between a nodule and a pleura included in the medical image; and
extracting the pleural indentation region within the range limited by the limiting,
wherein the nodule and the pleura are not attached to each other.

23. An information processing apparatus comprising:
at least one memory storing instruction; and
at least one processor that when executing the instructions, causes the information processing apparatus to perform operations comprising;
acquiring in a medical image, a first region and a second region different from the first region;
limiting extracting a third region, connecting the first region and the second region, within a range including an extraction direction determined based on the first region;
extracting the third region within the range limited by the limiting;
wherein the limiting includes determining the extraction direction based on a barycenter of the first region;

wherein the limiting includes determining the extraction direction based on a direction of a normal at a particular point on a contour of the first region and a direction from the barycenter to the particular point; and wherein the limiting includes setting the extraction direction to a direction given by a sum of the normal direction and the direction from the barycenter to the particular point or given by a weighted sum of the normal direction and the direction from the barycenter to the particular point in which one or more of the normal direction and the direction from the barycenter to the particular point is weighted.

24. An information processing apparatus comprising:
at least one memory storing instruction; and
at least one processor that when executing the instructions, causes the information processing apparatus to perform operations comprising;
acquiring in a medical image, a first region and a second region different from the first region;
limiting extracting a third region, connecting the first region and the second region, within a range including an extraction direction determined based on the first region;
extracting the third region within the range limited by the limiting;
wherein the limiting includes determining a size of the range within which to extract the third region based on a feature of the first region;
wherein the limiting includes determining the size of the range within which to extract the third region based on a size of the first region; and
wherein the limiting includes increasing the size of the range within which to extract the third region as the size of the first region increases.

25. An information processing apparatus comprising:
at least one memory storing instruction; and
at least one processor that when executing the instructions, causes the information processing apparatus to perform operations comprising;
acquiring in a medical image, a first region and a second region different from the first region;
limiting extracting a third region, connecting the first region and the second region, within a range including an extraction direction determined based on the first region;
extracting the third region within the range limited by the limiting; wherein in a case where the second region does not exist in the range within which to extract the third region, the extraction of the third region is not performed by the extracting.

* * * * *